United States Patent
Kimura et al.

(10) Patent No.: US 8,090,034 B2
(45) Date of Patent: Jan. 3, 2012

(54) TRANSMISSION APPARATUS AND A RECEPTION APPARATUS IN A MULTICARRIER TRANSMISSION SYSTEM AND A TRANSMISSION METHOD AND A RECEPTION METHOD USING THE MULTICARRIER TRANSMISSION SYSTEM

(75) Inventors: Tomohiro Kimura, Osaka (JP); Yukihiro Omoto, Osaka (JP); Kenichi Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 1072 days.

(21) Appl. No.: 11/915,444

(22) PCT Filed: Jun. 20, 2006

(86) PCT No.: PCT/JP2006/312280
§ 371 (c)(1),
(2), (4) Date: Nov. 26, 2007

(87) PCT Pub. No.: WO2006/137375
PCT Pub. Date: Dec. 28, 2006

(65) Prior Publication Data
US 2009/0180566 A1 Jul. 16, 2009

(30) Foreign Application Priority Data
Jun. 22, 2005 (JP) ................................ 2005-181939

(51) Int. Cl.
*H04K 1/10* (2006.01)
*H04L 27/28* (2006.01)
(52) U.S. Cl. ........ 375/260; 375/265; 375/346; 375/350; 370/210

(58) Field of Classification Search .................. 375/260, 375/265, 267, 340, 341, 346–350; 370/203–211
See application file for complete search history.

(56) References Cited

U.S. PATENT DOCUMENTS

| | | | |
|---|---|---|---|
| 2002/0048333 A1* | 4/2002 | Ahmed et al. | ................ 375/346 |
| 2003/0043927 A1 | 3/2003 | Suzuki | |
| 2003/0091111 A1 | 5/2003 | Vaananen | |
| 2003/0112901 A1 | 6/2003 | Gupta | |
| 2004/0258174 A1 | 12/2004 | Shao et al. | |

FOREIGN PATENT DOCUMENTS

| | | |
|---|---|---|
| JP | 2003-188847 | 7/2003 |
| JP | 2003-524337 | 8/2003 |

(Continued)

OTHER PUBLICATIONS

International Search Report mailed Sep. 26, 2006 for International Application No. PCT/JP2006/312280.

(Continued)

*Primary Examiner* — Curtis Odom
(74) *Attorney, Agent, or Firm* — Wenderoth, Lind & Ponack, L.L.P.

(57) ABSTRACT

Inter-carrier interference caused by frequency fluctuations, amplitude fluctuations, phase fluctuations, or the like is reduced without reducing a transmission efficiency. A receiving end has a canceling filter section that alleviates the inter-carrier interference caused by the frequency fluctuations, the amplitude fluctuations, the phase fluctuations, or the like through filtering processing. A transmitting end has a precoding section that facilitates determination of demodulation data in a vector demodulation section on the receiving end through precoding processing. Or, the receiving end has a trellis decoding section that decodes the demodulation data through trellis decoding processing.

16 Claims, 14 Drawing Sheets

FOREIGN PATENT DOCUMENTS

| | | |
|---|---|---|
| JP | 2005-510939 | 4/2005 |
| WO | 2004/077734 | 9/2004 |

OTHER PUBLICATIONS

Y. Zhao and S. -G. Haggman, Intercarrier Interference Self-Cancellation Scheme for OFDM Mobile Communication Systems, IEEE Transactions on Communications, vol. 49, No. 7, pp. 1185-1191, Jul. 2001.

J. G. Proakis, "Digital Communications third edition", pp. 548-557, McGraw-Hill, 1995.

A. J. Viterbi, "Convolutional Codes and Their Performance in Communication Systems", IEEE Transactions on Communications Technology, vol. COM-19, pp. 751-772, 1971.

L. R. Bahl, J. Cocke, F. Jelinek, J. Raviv, "Optical Decoding of Linear codes for Minimizing Symbol Error Rate", IEEE Transactions on Information Theory, vol. 20, pp. 284-287, 1974.

* cited by examiner (a)

| $X_i$ | $X'_{i-1}$ | $X'_i$ | $Y_i$ | $Y_{i-1}$ | $Y'_i$ |
|---|---|---|---|---|---|
| 0 | 0 | 0 | 0 | 0 | 0 |
| 0 | 1 | 1 | 1 | 1 | 0 |
| 0 | 2 | 2 | 2 | 2 | 0 |
| 0 | 3 | 3 | 3 | 3 | 0 |
| 1 | 0 | 1 | 1 | 0 | 1 |
| 1 | 1 | 2 | 2 | 1 | 1 |
| 1 | 2 | 3 | 3 | 2 | 1 |
| 1 | 3 | 0 | 0 | 3 | −3 |
| 2 | 0 | 2 | 2 | 0 | 2 |
| 2 | 1 | 3 | 3 | 1 | 2 |
| 2 | 2 | 0 | 0 | 2 | −2 |
| 2 | 3 | 1 | 1 | 3 | −2 |
| 3 | 0 | 3 | 3 | 0 | 3 |
| 3 | 1 | 0 | 0 | 1 | −1 |
| 3 | 2 | 1 | 1 | 2 | −1 |
| 3 | 3 | 2 | 2 | 3 | −1 |

(a)

(b)

(a)

(b)

TRANSMISSION APPARATUS AND A RECEPTION APPARATUS IN A MULTICARRIER TRANSMISSION SYSTEM AND A TRANSMISSION METHOD AND A RECEPTION METHOD USING THE MULTICARRIER TRANSMISSION SYSTEM

TECHNICAL FIELD

The present invention relates to a multicarrier transmission system, and more particularly, to a technique which reduces inter-carrier interference which is caused by fluctuations in a response of a transmission path in mobile communication and by phase noise or the like generated in a transmission apparatus and a reception apparatus.

BACKGROUND ART

As a method for performing stable communication in terrestrial digital television broadcasting, a wireless LAN (Local Area Network), etc. via a transmission path in which delay dispersion caused by a multipath is involved, a multicarrier transmission system which is typified by an orthogonal frequency division multiplexing (OFDM) transmission system (hereinafter, referred to as an OFDM transmission system) has been widely used. On the other hand, in mobile communication in which a transmission apparatus, a reception apparatus, or both of the transmission apparatus and the reception apparatus perform communication while in motion, frequency fluctuations which are caused by a Doppler phenomenon and amplitude fluctuations of a received signal which result from delay dispersion caused by a multipath occur. In addition, in a frequency conversion section of the transmission apparatus or the reception apparatus, phase fluctuations may be caused by phase noise in an oscillator circuit. In the OFDM transmission system, modulated waves of subcarriers are densely multiplexed to be transmitted so that frequency spectra thereof are mutually overlapped. Therefore, in a case where the OFDM transmission system is used for the mobile communication, orthogonality among the subcarriers is impaired due to the above-mentioned frequency fluctuations, amplitude fluctuations, phase fluctuations, or the like, and inter-carrier interference among the subcarriers arises, leading to a problem of deterioration in communication quality.

As a conventional technique of alleviating the inter-carrier interference in the OFDM transmission system, a scheme described in a non-patent document 1 (hereinafter, referred to as a self-cancellation scheme) has been known. This self-cancellation scheme, by dividing a plurality of subcarriers in the OFDM transmission system into a plurality of groups, each of which has L subcarriers (L is an integer greater than or equal to 2) whose frequency allocation is continuous, allows a specific correlation in modulation of the L subcarriers in one and the same group. Thus, the inter-carrier interference is cancelled and suppressed.

Hereinafter, referring to figures, the self-cancellation scheme which is the conventional technique of alleviating the inter-carrier interference will be specifically described.

FIG. 11 is a block diagram illustrating a configuration of a transmission apparatus and a reception apparatus in an OFDM transmission system using the above-mentioned self-cancellation scheme. FIG. 12 is a diagram showing (a) an allocation state of modulation vectors which are arranged on a frequency axis and showing (b) the modulation vectors and allocation of signal points (on a complex plane) of demodulation vectors which have been canceling-demodulated in the OFDM transmission system using the self-cancellation scheme. In FIG. 11, a transmission apparatus 101 receives transmitted data, OFDM-modulates carriers based on the received transmitted data, and generates to output an OFDM signal. The OFDM signal outputted from the transmission apparatus 101 is received via a transmission path 103 by a reception apparatus 102. The reception apparatus 102 demodulates the OFDM signal received via the transmission path 103 and outputs received data.

The transmission apparatus 101 comprises a vector modulation section 111, a canceling modulation section 112, an IDFT (Inverse Discrete Fourier Transform) section 113, a guard interval addition section 114, and a frequency conversion section 115. A multicarrier modulation section 126 is constructed of the IDFT section 113 and the guard interval addition section 114. Hereinafter, operations of the sections of the transmission apparatus 101 will be described. In order to describe the gist of the conventional art in a concise manner, operations per symbol in the OFDM transmission system will be described.

Transmitted data of K bits is inputted to the transmission apparatus 101 per symbol in the OFDM transmission system. The transmitted data inputted to the transmission apparatus 101 is supplied to the vector modulation section 111.

The vector modulation section 111 receives the transmitted data of K bits. The vector modulation section 111 divides the inputted transmitted data of K bits into G groups, generates and outputs G modulation vectors based on the transmitted data of (K/G) bits which are given to each of the groups. Each of the modulation vectors outputted by the vector modulation section 111 contains the transmitted data of (K/G) bits. Here, K and G are integers greater than 0. If the self-cancellation scheme is described supposing that K is a multiple of G, there accrues no problem. Therefore, in the below description, K is supposed to be a multiple of G.

The G modulation vectors outputted by the vector modulation section 111 are supplied to the canceling modulation section 112. The canceling modulation section 112 allocates the G modulation vectors to the G subcarrier groups, respectively. Here, the G subcarrier groups are obtained by dividing N subcarriers into G groups, each of which has L subcarriers whose frequency allocation is continuous. An equation N=G×L is satisfied.

In the canceling modulation section 112, by using a polynomial $P(D)=(1-D)^{(L-1)}$ of a discrete filter wherein a delay element is D, coefficients of the filter are determined. In the above-mentioned polynomial of the discrete filter, an impulse response of the filter is represented. The coefficients of the filter can be obtained by expanding the polynomial $P(D)=(1-D)^{(L-1)}$. An expansion thereof is expressed as a polynomial with respect to D. When the order of the coefficients of D is $P_0, P_1, P_2, \ldots P_{(L-1)}$ in order from the order 0, the expansion is expressed as $P(D)=P_0+P_1D+P_2D^2+\ldots P_{(L-1)}D^{(L-1)}$. The $P_0, P_1, P_2, \ldots P_{(L-1)}$ can be expressed by $P_i$ ($0 \leq i \leq (L-1)$ and i is an integer).

As mentioned above, each of the G subcarrier groups has the L subcarriers. The L subcarriers have numbers from 0 to (L−1) in the order of frequencies with the smallest one first. The canceling modulation section 112 generates a modulation vector with a coefficient, which performs multicarrier modulation, in the i-th subcarrier (($0 \leq i \leq (L-1)$ and i is an integer) among the subcarriers included in each of the subcarrier groups. The modulation vector with a coefficient can be obtained by multiplying the above-mentioned modulation vector, which is allocated to each of the groups, by the above-mentioned coefficient $P_i$. Thus, the canceling modulation section 112, based on the inputted G modulation vectors and the L coefficients $P_i$ allocated to respective subcarriers, generates and outputs N modulation vectors with the coefficients (N=G×L).

In a case where L is 2, because P(D)=1−D is satisfied (i.e. $P_0$=1, $P_1$=−1), polarities of modulation vectors which each modulate two neighboring subcarriers are inversed (see FIG. 12(a)). Thus, a pair of modulation vectors whose polarities are inversed are provided. The pair of two modulation vectors are supposed to contain the same transmitted data. Also in the case where L is 2, G=N/2 groups, each of which has two neighboring subcarriers, are provided.

The IDFT section 113 included in the multicarrier modulation section 126 receives the N modulation vectors with the coefficients, which are outputted by the canceling modulation section 112. The IDFT section 113 subjects the received modulation vectors with the coefficients to inverse Fourier transform. The IDFT section 113 outputs, as a baseband OFDM signal, the signal obtained after the inverse Fourier transform.

The guard interval addition section 114 receives the baseband OFDM signal outputted by the IDFT section 113. The guard interval addition section 114 adds a guard interval signal to the received baseband OFDM signal and outputs the signal.

The frequency conversion section 115 receives the baseband OFDM signal to which the guard interval signal has been added. The frequency conversion section 115 frequency-converts the received baseband OFDM signal to a signal in a wireless frequency band and outputs the OFDM signal in the wireless frequency band. The OFDM signal outputted by the frequency conversion section 115 is supplied via an aerial wire to the transmission path 103 as the OFDM signal outputted by the transmission apparatus 101.

The above-mentioned OFDM signal which has gone through the transmission path 103 is supplied via the aerial wire to the reception apparatus 102.

The reception apparatus 102 includes a frequency conversion section 121, a guard interval removal section 122, DFT (Discrete Fourier Transform) section 123, a canceling demodulation section 124, and a vector demodulation section 125. A multicarrier demodulation section 127 is constructed of the guard interval removal section 122 and the DFT section 123. Hereinafter, operations of the sections of the reception apparatus 102 will be described. In order to describe the gist of the conventional art in a concise manner, operations per symbol in the OFDM transmission system will be described.

The OFDM signal which the reception apparatus 102 has received via the transmission path 103 is supplied to the frequency conversion section 121.

The frequency conversion section 121 receives the OFDM signal in the wireless frequency band, which the reception apparatus 102 has received. The frequency conversion section 121, by subjecting the received OFDM signal to down conversion, generates and outputs a baseband OFDM signal.

The guard interval removal section 122 receives the baseband OFDM signal outputted by the frequency conversion section 121. The guard interval removal section 122 removes a guard interval signal from the received baseband OFDM signal and outputs the resultant signal.

The DFT section 123 included in the multicarrier demodulation section 127 receives the baseband OFDM signal from which the guard interval signal has been removed. The DFT section 123, by subjecting the received baseband OFDM signal to Fourier transform, generates and outputs N demodulation vectors with coefficients.

The canceling demodulation section 124 receives the N demodulation vectors with coefficients. The canceling demodulation section 124 first divides the received N demodulation vectors with coefficients into G groups. Next, the canceling demodulation section 124 removes the coefficient $P_i$ ($0 \leq i \leq (L-1)$) in each of the groups by multiplying the i-th demodulation vector with a coefficient by a reciprocal of the above-mentioned coefficient $P_i$, obtains a total sum from which the coefficient $P_i$ has been removed, and generates to output a demodulation vector. As the demodulation vector, one vector for each of the subcarrier groups is generated and outputted. Therefore, G demodulation vectors for all of the subcarrier groups are generated and outputted.

The vector demodulation section 125 receives the G demodulation vectors outputted by the canceling demodulation section 124. The vector demodulation section 125 determines and outputs K pieces of demodulation data from the received G demodulation vectors.

The K pieces of demodulation data outputted by the vector demodulation section 125 is outputted as demodulation data from the reception apparatus 102.

Here, a principle of the technique of alleviating the inter-carrier interference by using the self-cancellation scheme will be described.

If frequency fluctuations occur on a subcarrier due to a Doppler phenomenon, inter-carrier interference between the subcarrier and a plurality of the other subcarriers is generated. An interference component of the inter-carrier interference has great correlation among subcarriers neighboring in a frequency axis direction. In other words, it has been known that when an interference coefficient of the inter-carrier interference which occurs between the i-th subcarrier and the k-th subcarrier due to the frequency fluctuations on the i-th subcarrier is S(i−k) and an interference coefficient of the inter-carrier interference which occurs between the (i+1)-th subcarrier and the k-th subcarrier due to the frequency fluctuations on the (i+1)-th subcarrier is S(i+1−k), there is a relationship S(i−k)≈S(i+1−k) between the interference coefficients (details are described in non-patent document 1).

As the simplest example, a case where the number L of subcarriers which the above-mentioned group has is 2 will be described. In the case of L=2, an expansion of the above-mentioned polynomial P(D) is P(D)=1−D, with $P_0$=1 and $P_1$=−1. Suppose that a modulation vector (provided from the vector modulation section 111) transmitted by two of the i-th subcarrier and the (i+1)th subcarrier which a subcarrier group has is X(i). Because of $P_0$=1 and $P_1$=−1, the canceling modulation section 112 performs canceling modulation by allocating $P_0 X(i)$=X(i) to the i-th subcarrier and $P_1 X(i)$=−X(i) to the (i+1) subcarrier. Here, a difference Sc between an amount of the inter-carrier interference occurring between the i-th subcarrier having the frequency fluctuations and the k-th subcarrier and an amount of the inter-carrier interference occurring between the (i+1)-th subcarrier having the frequency fluctuations and the k-th subcarrier is Sc=X(i)S(i−k)−X(i)S(i+1−k). When a right-hand side is arranged with a common term X(i), Sc=X(i)(S(i−k)−S(i+1−k)) results. There is the relationship S(i−k)≈S(i+1−k) between the interference coefficients of the inter-carrier interference S(i−k) and S(i+1−k) as mentioned above, and when a right-hand side is transposed to a left-hand side, S(i−k)−S(i+1−k)≈0 results. Therefore, the difference between the above-mentioned amounts of the inter-carrier interference is substantially zero (Sc≈0). In other words, the difference between the amount of the inter-carrier interference occurring between the i-th subcarrier having the frequency fluctuations and the k-th subcarrier and an amount of the inter-carrier interference occurring between the (i+1)-th subcarrier having the frequency fluctuations and the k-th subcarrier is substantially zero, and these amounts of inter-carrier interference are mutually canceled. Thus, generation of the inter-carrier interference is reduced.

Based on the above-described principle, the canceling demodulation section 124 included in the reception apparatus 102 cancels the inter-carrier interference.

[Non-patent document 1] Y. Zhao and S.-G. Haggman, "Inter-carrier Interference Self-Cancellation. Scheme for OFDM Mobile Communication Systems", IEEE Transactions on Communications, Vol. 49, No. 7, pp. 1185-1191, July 2001

[Non-patent document 2] J. G. Proakis, "DIGITAL COMMUNICATIONS second third edition", pp. 548-557, McGraw-Hill

[Non-patent document 3] A. J. Viterbi, "Convolutional Codes and Their Performance in Communication Systems", IEEE Transactions on communications, Vol. COM-19, pp. 751-772, 1971

[Non-patent document 4] L. R. Bahl, J. Cocke, F. Jelinek, J. Raviv, "Optimal decoding of linear codes for minimizing symbol error rate", IEEE Transactions on Information Theory, Vol. 20, pp. 284-287, 1974

SUMMARY OF THE INVENTION

Problems to be Solved by the Invention

However, when using the above-described technique, in the canceling modulation section 112, one subcarrier group has the L subcarriers and only one modulation vector containing the same transmitted data in each of the groups is transmitted. Therefore, in the above-described conventional technique, a signal transmission efficiency is one L-th, as compared with a general OFDM transmission system in which modulation vectors are independently allocated to all of respective subcarriers, leading to a problem of a reduction in a transmission efficiency. If the same transmission efficiency as that of the general OFDM transmission system is tried to be realized, in the vector modulation section 111, L times as much transmitted data as that of the general OFDM transmission system must be contained in one modulation vector. In this case, a distance between signal points in the transmitted data is shortened. The distance between signal points indicates tolerance against noise. The longer the distance between signal points, the stronger the tolerance against noise. Therefore, containing much transmitted data leads to shortening the distance between signal points, resulting in a problem of deterioration of transmission quality. For example, 16 QAM is capable of transmitting 4 bits of information per modulation vector. If by using the above-described conventional technique, the same transmission efficiency as that obtained when the general OFDM transmission is performed is tried to be realized with this 16 QAM, even with L=2, there is no choice but to use 256 QAM which is capable of transmitting 8 bits of information per modulation vector. In this case, it is easily understood that transmission quality is deteriorated.

In addition, in the canceling modulation section 112 in the above-described conventional technique, the canceling modulation for each of the two neighboring subcarriers is performed by using the modulation vectors whose polarities are inversed from each other based on the polynomial P(D) of filtering. In this case, owing to a filtering effect of the canceling modulation section 112, in a time response waveform of the baseband OFDM signal outputted by the IDFT section 113, signals having high power outputs are concentrated around the time of a central portion of a symbol and signal amplitudes around the central portion of the symbol are large (see a lower row in FIG. 13). In an upper row in FIG. 13, a power-time response of OFDM signals in a case of the general OFDM is shown and in the lower row in FIG. 13, a power-time response of OFDM signals in a case of the above-described conventional technique (self cancellation scheme) is shown. In FIG. 13, a horizontal axis shows sampling time in the symbol and a vertical axis shows an instantaneous power value obtained when an average power is 1. In general, the OFDM transmission system has a problem that a transmission peak power is high as compared with a transmission average power and a high-frequency power amplifier whose maximum output power is high is needed. However, when the self-cancellation scheme is used, the transmission peak power is further high around the central portion of the symbol. Therefore, the above-described conventional technique has a problem that the high-frequency power amplifier whose maximum output power is higher than that of the general OFDM transmission system is needed. For example, if in the self-cancellation scheme, the above-mentioned number L of the subcarriers is 2, the transmission peak power is doubled as compared with that of the general OFDM transmission system (see FIG. 13).

In addition, in the above-described conventional technique, as shown in FIG. 12(*a*), the pair of modulation vector whose polarities are inversed and which have the same transmitted data are provided. This is not to increase the number of signal points of demodulation vectors, for which the canceling demodulation has been performed, when compared with the number of signal points (on the complex plane showing allocation of the signal points) of the modulation vectors (see FIG. 12(*b*)). When the number of signal points is not increased, the signal points can be obtained one-on-one on a transmitting end and a receiving end (see FIG. 12(*b*)) and the transmitted data can be easily restored on the receiving end. In an example shown in FIG. 12(*b*), the number of signal points of the modulation vectors is 4 (the number of the x marks) and the number of signal points of the demodulation vectors after the canceling demodulation is also 4 (the number of the ● marks).

Based on the above-mentioned characteristics of the inter-carrier interference, the canceling demodulation is performed through subtraction of demodulation vectors corresponding to the neighboring subcarriers. The signal points whose polarities are inversed shift to positions which are point-symmetric with respect to an origin point in the diagram showing the allocation of signal points (see FIG. 12(*b*)). Therefore, even when the subtraction is conducted between the demodulation vectors corresponding to the neighboring subcarriers, sizes of the vectors are doubled. In other words, in the diagram showing the allocation of signal points, the positions of the signal points just shift outside. As shown in FIG. 12(*b*), the number of signal points does not change between before and after the canceling demodulation.

On the other hand, if modulation vectors whose polarities are not inversed as shown in FIG. 14(*a*) are used, the number of signal points is increased after the canceling demodulation. In the case where the polarities are not inversed, all of the modulation vectors have directions in accordance with corresponding transmitted data. In FIG. 14(*a*), for convenience of diagrammatic representation, the directions of all of the modulation vectors which are the same as one another are shown. In the example shown in FIG. 14(*b*), whereas the number of signal points of modulation vectors is 4 (the number of x marks), the number of signal points of demodulation vectors for which the canceling demodulation has been performed is 9 (the number of ● marks). This is because subtraction between the vectors of the 4 signal points is conducted and as a result, the 9 signal points appear. In this case, unless any measures are taken, it is impossible to uniquely restore the original transmitted data on the receiving end. This means that data cannot be accurately transmitted.

For these reasons, conventionally, in order to reduce the inter-carrier interference, in a case where the number L of subcarriers allocated in each of the groups, for example, is 2, a pair of modulation vectors, in each of the subcarrier groups, whose polarities are inversed are provided. However, in the case where the subcarriers are divided into the groups, as described above, because the subcarriers in each of the groups are modulated only by the same transmitted data, the transmission efficiency is reduced to 1/L. The above-mentioned increase in the number of the signal points arises in a case where the canceling demodulation is performed in order to reduce the inter-carrier interference, and if the canceling demodulation is not performed, the above-mentioned increase in the number of the signal points does not arise.

In order to solve the above-mentioned conventional problems, an object of the present invention is to provide a multicarrier transmission system which is capable of alleviating inter-carrier interference caused by frequency fluctuations, amplitude fluctuations, or phase fluctuations without reducing a transmission efficiency.

Solution to the Problems

A transmission apparatus in a transmission system according to the present invention is a transmission apparatus in a multicarrier transmission system which subjects subcarriers, which are orthogonal with each other, to multicarrier modulation and transmits digital data, comprising: a precoding section for receiving transmitted data, subjecting the transmitted data to precoding processing, generating modulation information which has been precoded, and outputting the precoded modulation information; a vector modulation section for converting the precoded modulation information to modulation vectors on a complex plane and outputting the modulation vectors; and a multicarrier modulation section for subjecting the subcarriers to modulation by using the modulation vectors, generating a multicarrier modulation signal, and outputting the multicarrier modulation signal, wherein the multicarrier modulation section modulates the subcarriers in a one-on-one relationship by using the modulation vectors, and when in a reception apparatus, the multicarrier modulation signal is multicarrier-demodulated and the demodulation vectors obtained by the multicarrier-demodulation are subjected to filtering processing which cancels inter-carrier interference, the filtered demodulation vectors obtained by the filtering processing uniquely correspond to the precoded modulation information.

As a multicarrier transmission system of the present invention, an OFDM (Orthogonal Frequency Division Multiplexing) transmission system and, among others, a transmission system using wavelet modulation or the like are also included. According to the present invention, the precoding section subjects the transmitted data to the precoding processing. This precoding processing is coding processing to which the transmitted data has been previously subjected such that the demodulation vectors which in the reception apparatus, have been subjected to the filtering processing, which cancels the inter-carrier interference, uniquely correspond to the modulation information which has been precoded in the transmission apparatus. By performing the precoding processing, even if the number of signal points is increased through the filtering processing in the reception apparatus, the precoded modulation information can be uniquely derived in the reception apparatus. When the precoded modulation information can be uniquely derived, the transmitted data can be accurately restored based on the modulation information. In addition, the multicarrier modulation section modulates the subcarriers in a one-on-one relationship by using the modulation vectors. Thus, the respective subcarriers are individually modulated by the transmitted data, thereby avoiding a reduction in a transmission efficiency. Therefore, according to the present invention, the inter-carrier interference caused by frequency fluctuations, amplitude fluctuations, phase fluctuations, or the like can be reduced without reducing the transmission efficiency, and the transmitted data can be accurately restored in the reception apparatus.

In the present invention, it is preferable that at start of the precoding processing, the precoding section divides the transmitted data into a plurality of groups, each of which has the transmitted data as tentative modulation information, and the precoding section previously receives and holds, by using an equation (1), (L−1) pieces of modulation information $X'_{2-L}, \ldots, X'_0$, which are needed when a first piece of information $X_1$ of the tentative modulation information is subjected to the precoding processing, as initial values prior to receiving the first piece of information $X_1$.

$$X'_i = P_0 X_i - \sum_{l=1}^{L-1} P_l X'_{i-l} \pmod{M} \quad \text{Equation (1)}$$

In this case, since the predetermined initial values are previously inputted to the precoding section, the precoding processing can be performed in an ensured manner.

In the present invention, it is preferable that the precoding section is constructed of an IIR (Infinite Impulse Response) filter in which a remainder device is included and an impulse response, when a delay element is D, is represented as $1/(1-D)^{(L-1)}$ (L is an integer greater than or equal to 2).

A reception apparatus in a multicarrier transmission system according to the present invention is a reception apparatus in a multicarrier transmission system which subjects a plurality of subcarriers, which are orthogonal with each other, to multicarrier modulation and transmits digital data, comprising: a multicarrier demodulation section for receiving a multicarrier modulation signal, demodulating the received multicarrier modulation signal, and outputting demodulation vectors obtained by the demodulation; a canceling filter section for receiving the demodulation vectors, subjecting the demodulation vectors, which respectively correspond to the subcarriers neighboring in a frequency axis direction, to filtering processing which cancels inter-carrier interference, and outputting filtered demodulation vectors obtained by the filtering processing; and a vector demodulation section for determining received data from the filtered demodulation vectors and outputting the data, wherein the multicarrier demodulation section demodulates the modulation vectors which modulate the subcarriers in a one-on-one relationship, and the filtered demodulation vectors uniquely correspond to precoded modulation information obtained by subjecting transmitted data to precoding processing in a transmission apparatus, and it is possible to determine a correspondence relationship thereof in the vector demodulation section.

According to the present invention, the canceling filter section performs the filtering processing which cancels the inter-carrier interference. Thus, the inter-carrier interference is reduced. In addition, the demodulation vectors which have been subjected to the filtering uniquely correspond to the modulation information which has been precoded in the transmission apparatus. The vector demodulation section is capable of determining a correspondence relationship thereof. Thus, even if the number of signal points is increased through the filtering processing, the vector demodulation section is capable of accurately restoring the transmitted data which correspond to the demodulation vectors which have been subjected to the filtering. In addition, the multicarrier demodulation section demodulates the modulation vectors obtained by modulating the subcarriers in a one-on-one relationship. Since the respective subcarriers are individually modulated by the transmitted data, the transmission efficiency is not reduced. Therefore, according to the present invention, the inter-carrier interference caused by the frequency fluctuations, the amplitude fluctuations, the phase fluctuations, or the like can be reduced without reducing the transmission efficiency, and the transmitted data can be accurately restored in the reception apparatus.

In the present invention, it is preferable that at start of the filtering processing, the canceling filter section previously receives, from the transmission apparatus, and holds (L−1) demodulation vectors $Y_{2-L}, \ldots, Y_0$, which are needed when a first value $Y_1$ among values of the above-mentioned demodulation vectors is subjected to the filtering processing by using an equation (2) for performing the filtering processing, as initial values prior to receiving the first value $Y_1$ among the values of the above-mentioned demodulation vectors.

$$Y'_i = \sum_{l=0}^{L-1} P_l Y_{i-l} \qquad \text{Equation (2)}$$

In this case, since the predetermined initial values are previously received by and inputted to the canceling filter section, the processing for canceling the inter-carrier interference can be performed in an ensured manner.

In the present invention, it is preferable that the reception apparatus in the multicarrier transmission system further comprises a fluctuation amount estimation section for estimating a fluctuation amount of any one of frequency fluctuations, amplitude fluctuations, or phase fluctuations in the received multicarrier modulation signal and the fluctuation amount estimation section controls filter coefficients of the canceling filter section in accordance with the estimated fluctuation amount. In this case, a deviation in a response of a transmission path, which is caused by the fluctuations such as the frequency fluctuations, the phase fluctuations, or the amplitude fluctuations, can be compensated, thereby further alleviating influence of the fluctuations.

In the present invention, it is preferable that the canceling filter section includes an FIR (Finite Impulse Response) filter having a delay device in which an impulse response, when a delay element is D, is represented as $(1-D)^{(L-1)}$ (L is an integer greater than or equal to 2).

In the present invention, it is preferable that the reception apparatus in the multicarrier transmission system further comprises a moving velocity measurement section for detecting a velocity at which the reception apparatus moves and filter coefficients of the canceling filter section are controlled in accordance with moving velocity information obtained by the moving velocity measurement section. In this case, influence of the frequency fluctuations in particular can be further reduced.

In the present invention, it is preferable that the reception apparatus includes a velocity pulse generation section for a mobile unit, and the moving velocity measurement section, based on a velocity pulse outputted by the velocity pulse generation section, obtains moving velocity information of the reception apparatus. In this case, the influence of the frequency fluctuations in particular can be further reduced.

In the present invention, it is preferable that the moving velocity measurement section acquires positional information of the reception apparatus at predetermined time intervals and based on the positional information and the time intervals, obtains moving velocity information of the reception apparatus. In this case, the influence of the frequency fluctuations in particular can be further reduced.

A reception apparatus in a multicarrier transmission system according to the present invention is a reception apparatus in a multicarrier transmission system which subjects subcarriers, which are orthogonal with each other, to multicarrier modulation and transmits digital data, comprising: a multicarrier demodulation section for receiving a multicarrier modulation signal from a transmission apparatus, demodulating the multicarrier modulation signal, and outputting demodulation vectors obtained by the demodulation; a canceling filter section for receiving the demodulation vectors, subjecting the demodulation vectors, which respectively correspond to the subcarriers neighboring in a frequency axis direction, to filtering processing which cancels inter-carrier interference, and outputting filtered demodulation vectors obtained by the filtering processing; and a trellis decoding section for receiving the filtered demodulation vectors, subjecting the filtered demodulation vectors to decoding processing based on trellis transition using a state variable of the filtering processing, and outputting received data obtained by the decoding processing, wherein the multicarrier demodulation section demodulates the modulation vectors which modulate the subcarriers in a one-on-one relationship.

According to the present invention, the canceling filter section performs the filtering processing which cancels the inter-carrier interference. Thus, the inter-carrier interference is reduced. In addition, the trellis decoding section receives the filtered demodulation vectors, subjects the filtered demodulation vectors to the decoding processing based on the trellis transition using the state variable of the filtering processing, and outputting the received data obtained by the decoding processing. Thus, even if the number of signal points is increased through the filtering processing, the transmitted data can be accurately restored in the reception apparatus without subjecting the transmitted data to the precoding processing in the transmission apparatus. In addition, the multicarrier demodulation section demodulates the modulation vectors which modulate the subcarriers in a one-on-on relationship. Since the respective subcarriers are individually modulated by the transmitted data, the transmission efficiency is not reduced. Therefore, according to the present invention, the inter-carrier interference caused by the frequency fluctuations, the amplitude fluctuations, the phase fluctuations, or the like can be reduced without reducing the transmission efficiency, and the transmitted data can be accurately restored in the reception apparatus. Moreover, also when a signal is received from a general transmission apparatus including no precoding section, the above-mentioned effects can be exhibited.

Effect of the Invention

According to the present invention, all of the subcarriers are respectively subjected to the modulation in an independent manner. Thus, without reducing the transmission efficiency, the inter-carrier interference caused by the frequency fluctuations, the amplitude fluctuations, phase fluctuations, or the like can be reduced, and high quality mobile communication can be realized.

BRIEF DESCRIPTION OF THE DRAWINGS

FIG. 7 is a diagram showing arithmetic processing performed in the precoding section and arithmetic processing performed in the canceling filter section in the embodiment 1 of the present invention.

Figure 1:
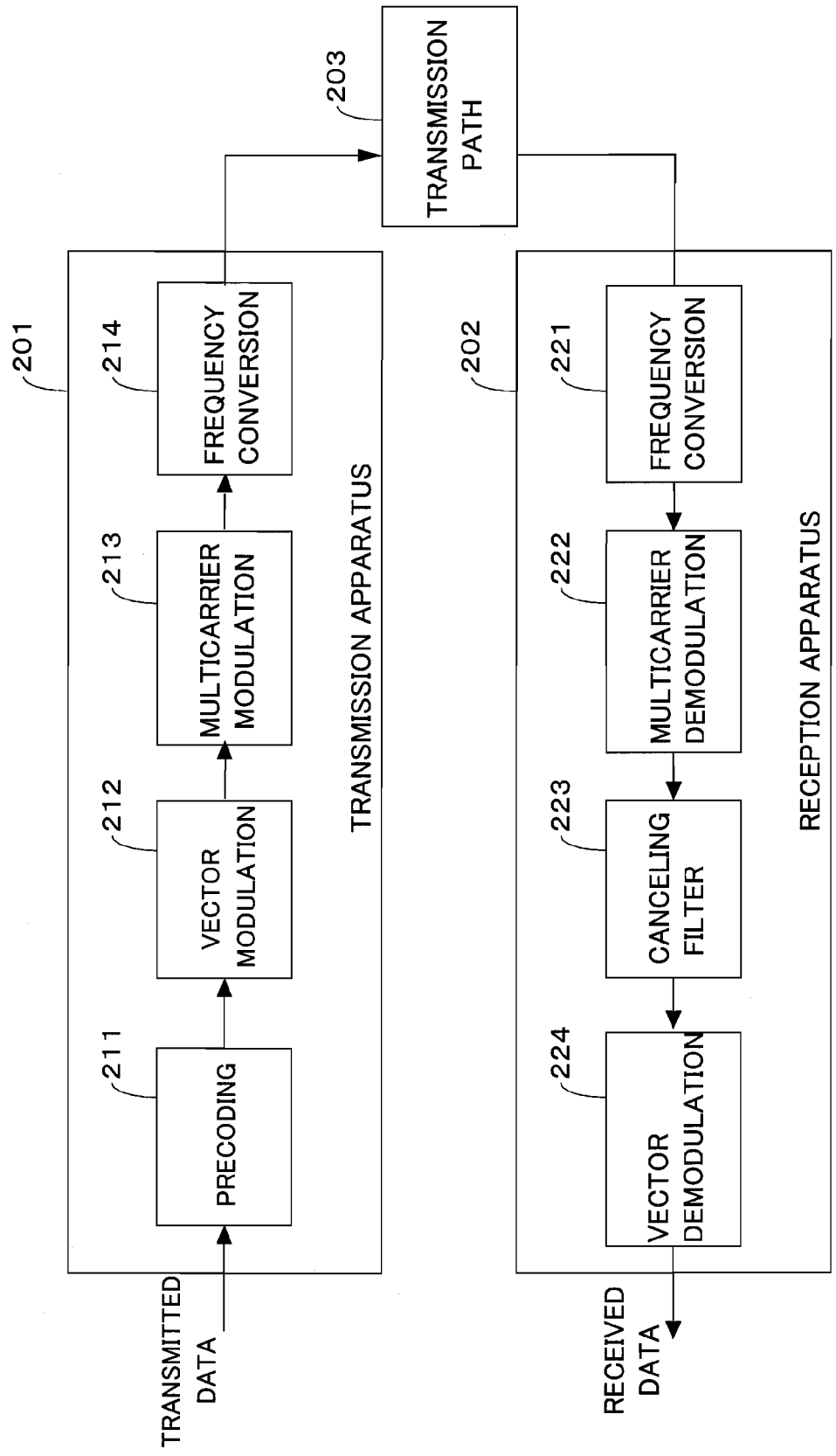
FIG. 1 is a block diagram illustrating a configuration of a transmission apparatus and a reception apparatus in a multicarrier transmission system according to an embodiment 1 of the present invention.

DESCRIPTION OF THE REFERENCE CHARACTERS 201 transmission apparatus
202, 2020 reception apparatus
211 precoding section
212 vector modulation section
213 multicarrier modulation section
222 multicarrier demodulation section
223 canceling filter section
224 vector demodulation section
225 trellis decoding section
226 fluctuation amount estimation section
227 moving velocity measurement section

DETAILED DESCRIPTION OF THE INVENTION

Hereinafter, referring to figures, embodiments of the present invention will be described.

Embodiment 1

FIG. 1 is a block diagram illustrating a configuration of a transmission apparatus and a reception apparatus in a multicarrier transmission system according to an embodiment 1 of the present invention.

A transmission apparatus 201 receives transmitted data, performs multicarrier modulation based on the received transmitted data, and generate to output a multicarrier signal. The multicarrier signal outputted from the transmission apparatus 201 is given via a transmission path 203 to a reception apparatus 202. The reception apparatus 202 demodulates the multicarrier signal which has been received via the transmission path 203 and outputs received data.

The transmission apparatus 201 comprises a precoding section 211, a vector modulation section 212, a multicarrier modulation section 213, and a frequency conversion section 214. Hereinafter, operations of respective sections of the transmission apparatus 201 will be described. In order to describe the gist of the present invention in a concise manner, operations per symbol in multicarrier transmission will be described.

Transmitted data of K bits per symbol is inputted to the transmission apparatus 201. The transmitted data inputted to the transmission apparatus 201 is supplied to the precoding section 211.

Precoding processing in the precoding section 211 is performed in order that the vector demodulation section 224 in the reception apparatus 102 easily determines demodulation data from demodulation vectors.

The precoding section 211 receives the transmitted data of K bits and divides the received transmitted data of K bits into N groups. Through this dividing processing, tentative modulation information is generated. The precoding section 211 subjects the transmitted data of (K/N) bits, i.e. the tentative modulation information, which each of the groups has, to the precoding processing described below and generate to output N pieces of modulation information. Here, the precoding section 211 performs precoding processing corresponding to processing performed by the canceling filter section 223 in the reception apparatus 202. K and N are integers greater than 0. In the description of the embodiment 1, if K is a multiple of N, there accrues no problem. Therefore, in the below description, K is supposed to be a multiple of N.

The vector modulation section 212 receives N pieces of precoded modulation information outputted by the precoding section 211. The vector modulation section 212 generates modulation vectors based on the received modulation information and outputs the N modulation vectors.

The multicarrier modulation section 213 receives the N modulation vectors outputted by the vector modulation section 212. The multicarrier modulation section 213 subjects N subcarriers to modulation by using the N modulation vectors and generates to output a multicarrier modulation signal in a baseband.

The frequency conversion section 214 receives the multicarrier modulation signal in the baseband, which is outputted by the multicarrier modulation section 213. The frequency conversion section 214 frequency-converts the received multicarrier modulation signal in the baseband to a signal in a predetermined wireless frequency band and outputs the frequency-converted signal as the multicarrier modulation signal. The multicarrier modulation signal outputted by the frequency conversion section 214 is supplied via an aerial wire to the transmission path 203 as the multicarrier modulation signal outputted by the transmission apparatus 201.

The above-mentioned multicarrier modulation signal having gone through the transmission path 203 is supplied via the aerial wire to the reception apparatus 202.

The reception apparatus 202 comprises, a frequency conversion section 221, a multicarrier demodulation section 222, a canceling filter section 223, and a vector demodulation section 224. Hereinafter, operations of respective sections of the reception apparatus 202 will be described. In order to describe the gist of the present invention in a concise manner, operations per symbol in multicarrier transmission will be described.

The multicarrier modulation signal which the reception apparatus 202 has received via the transmission path 203 is supplied to the frequency conversion section 221.

The frequency conversion section 221 receives the multicarrier modulation signal which the reception apparatus 202 has received. The frequency conversion section 221 frequency-converts the received multicarrier modulation signal to a signal in a baseband and outputs the frequency-converted signal as a multicarrier modulation signal in the baseband.

The multicarrier demodulation section 222 receives the multicarrier modulation signal in the baseband, which is outputted by the frequency conversion section 221. The multicarrier demodulation section 222 demodulates the multicarrier modulation signal corresponding to N subcarriers and generate to output N demodulation vectors.

The canceling filter section 223 receives the N demodulation vectors outputted by the multicarrier demodulation section 222. Although details will be described below, the canceling filter section 223 individually subjects each of the demodulation vectors, respectively corresponding to each of neighboring subcarriers, to the filtering processing, whereby the N demodulation vectors which have been subjected to the filtering are generated and outputted.

The vector demodulation section 224 receives the N demodulation vectors, outputted by the canceling filter section 223, which have been subjected to the filtering. The vector demodulation section 224 determines demodulation data of K bits from the demodulation vectors which have been subjected to the filtering and outputs the demodulation data.

The demodulation data of K bits outputted by the vector demodulation section 224 is outputted as the demodulation data from the reception apparatus 102.

Figure 2:
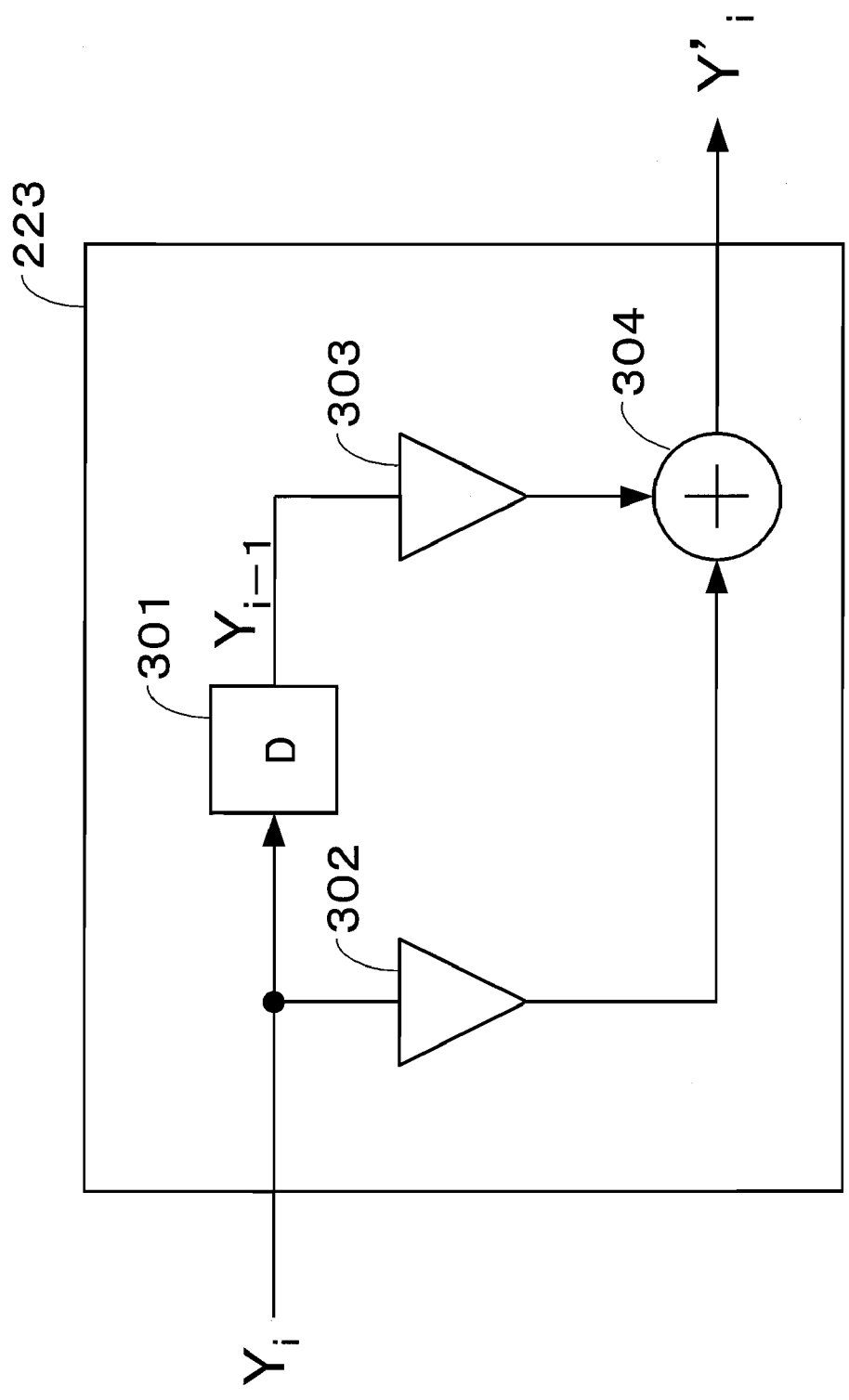
FIG. 2 is a block diagram illustrating a configuration example of a canceling filter section in the embodiment 1 of the present invention.
Figure 3:
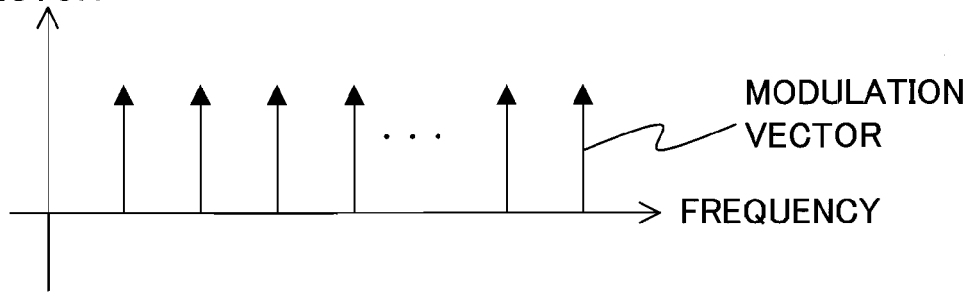
FIG. 3 is a diagram showing (a) an allocation state of modulation vectors which are arranged on a frequency axis of the subcarriers and showing (b) allocation of signal points (on a complex plane) of the modulation vectors and the demodulation vectors which have been subjected to canceling filter processing in the embodiment 1 of the present invention.
Figure 3:
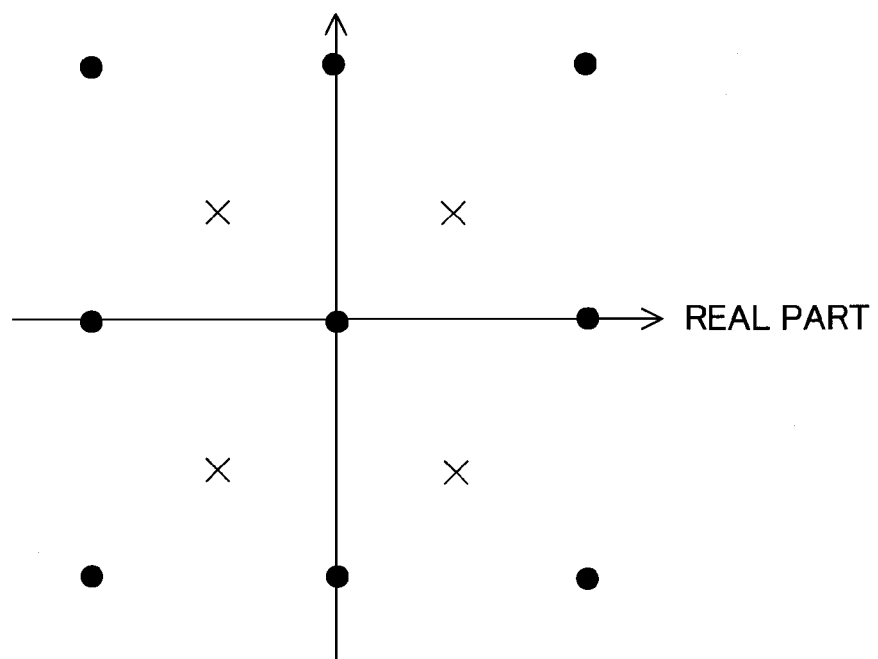

FIG. 2 is a block diagram illustrating a configuration example of the canceling filter section 223 in the reception apparatus 102 according to the embodiment 1 in the present invention. FIG. 3(a) is a diagram illustrating an allocation state of the modulation vectors, in the embodiment 1 of the present invention, which are arranged on a frequency axis of the subcarriers. FIG. 3(b) is a diagram showing allocation of signal points (on a complex plane) of the modulation vectors and the demodulation vectors which have been subjected to canceling filter processing in the embodiment 1. In FIG. 3(b), x marks indicate examples of the signal points of the modulation vectors outputted from the vector modulation section 212 and ● marks indicate examples of signal points of demodulation vectors, outputted from the canceling filter section 223, which have been subjected to the filtering processing.

The canceling filter section 223 shown in FIG. 2 sequentially receives the N demodulation vectors from the multicarrier demodulation section 222. The canceling filter section 223 causes the N subcarriers to correspond to the received demodulation vectors in a one-on-one relationship (see FIG. 3). Processing in which the subcarriers are multicarrier-modulated by the modulation vectors is performed in the multicarrier modulation section 213. In the example shown in FIG. 3(a), directions of all of the modulation vectors are the same as one another. However, this is just for convenience, and if positions of the signal points (see FIG. 3(b)) are different in accordance with the transmitted data, the directions of the modulation vectors are also different. The N subcarriers have numbers from 1 to N in the order of allocation in a frequency axis direction. The N demodulation vectors are represented as $Y_1, Y_2, \ldots, Y_N$ in order. The canceling filter section 223 uses an equation of filtering $P(D)=(1-D)^{(L-1)}$ (L is an integer greater than or equal to 2) for filtering. When the equation $P(D)=(1-D)^{(L-1)}$ is expanded, a polynomial $P(D)=P_0+P_1D+P_2D^2+\ldots P_{(L-1)}D^{(L-1)}$ is obtained. The canceling filter section 223, using the following equation (1), obtains the N demodulation vectors $Y'_1, Y'_2, \ldots, Y'_N$ which have been subjected to the filtering. The canceling filter section 223 sequentially outputs the obtained demodulation vectors.

$$Y'_i = \sum_{l=0}^{L-1} P_l Y_{i-l}$$ Equation (1)

The canceling filter section 223 can be constructed as an FIR (Finite Impulse Response) type filter. For example, if in the equation of filtering $P(D)=(1-D)^{(L-1)}$, a filter length L is 2, $P(D)=(1-)$ results. In other words, in an expansion of the equation $P(D)$, $P_0=1$ and $P_1=-1$ result. In this case, the canceling filter section 223 can be constructed as shown in FIG. 2. As shown in FIG. 2, the canceling filter section 223 includes a delay device 301, a coefficient providing devices 302 and 303, and an adder 304. The canceling filter section 223 sequentially receives the N demodulation vectors $Y_i$ from the multicarrier demodulation section 222. The delay device 301 delays the sequentially received demodulation vectors $Y_i$ by one sample and outputs the resultant. The delay device 301 outputs demodulation vectors $Y_{i-1}$ of a sample which is immediately precoding at the time at which the demodulation vectors $Y_i$ are inputted. The inputted demodulation vectors $Y_i$ are multiplied by a filter coefficient "1" in the coefficient providing device 302. This coefficient is set based on "$P_0=1$". The demodulation vectors $Y_{i-1}$ outputted by the delay device 301 are multiplied by a filter coefficient "-1" in the coefficient providing device 303. This coefficient is set based on "$P_1=-1$". In the adder 304, a sum of the demodulation vectors multiplied by the coefficient in the coefficient providing device 302 and the demodulation vectors multiplied by the coefficient in the coefficient providing device 303 is obtained. Thus, the demodulation vectors $Y'_i$ which have been subjected to the filtering are sequentially obtained. The canceling filter section 223 sequentially outputs the demodulation vectors $Y'_i$ which have been subjected to the filtering.

As described in the "BACKGROUND ART", the sum of the inter-carrier interference occurring between the i-th subcarrier and the k-th subcarrier and the inter-carrier interference occurring between the (i+1)-th subcarrier and the k-th subcarrier is substantially zero and these inter-carrier interferences are mutually canceled. Therefore, interference components of the demodulation vectors $Y'_i$ which have been subjected to the filtering in the canceling filter section 223 are substantially zero. In other words, the inter-carrier interferences which the neighboring subcarriers exert on the other subcarriers are mutually canceled owing to the filtering effect based on the polynomial P(D). Accordingly, the inter-carrier interference caused by the frequency fluctuations, the amplitude fluctuations, the phase fluctuations, or the like can be reduced in the canceling filter section 223. In addition, in the embodiment 1, because the N modulation vectors are respectively allocated to the N subcarriers, the modulation vectors correspond to the subcarriers in a one-on-one manner. Thus, unlike in the conventional art, the transmission efficiency is not reduced.

Figure 4:
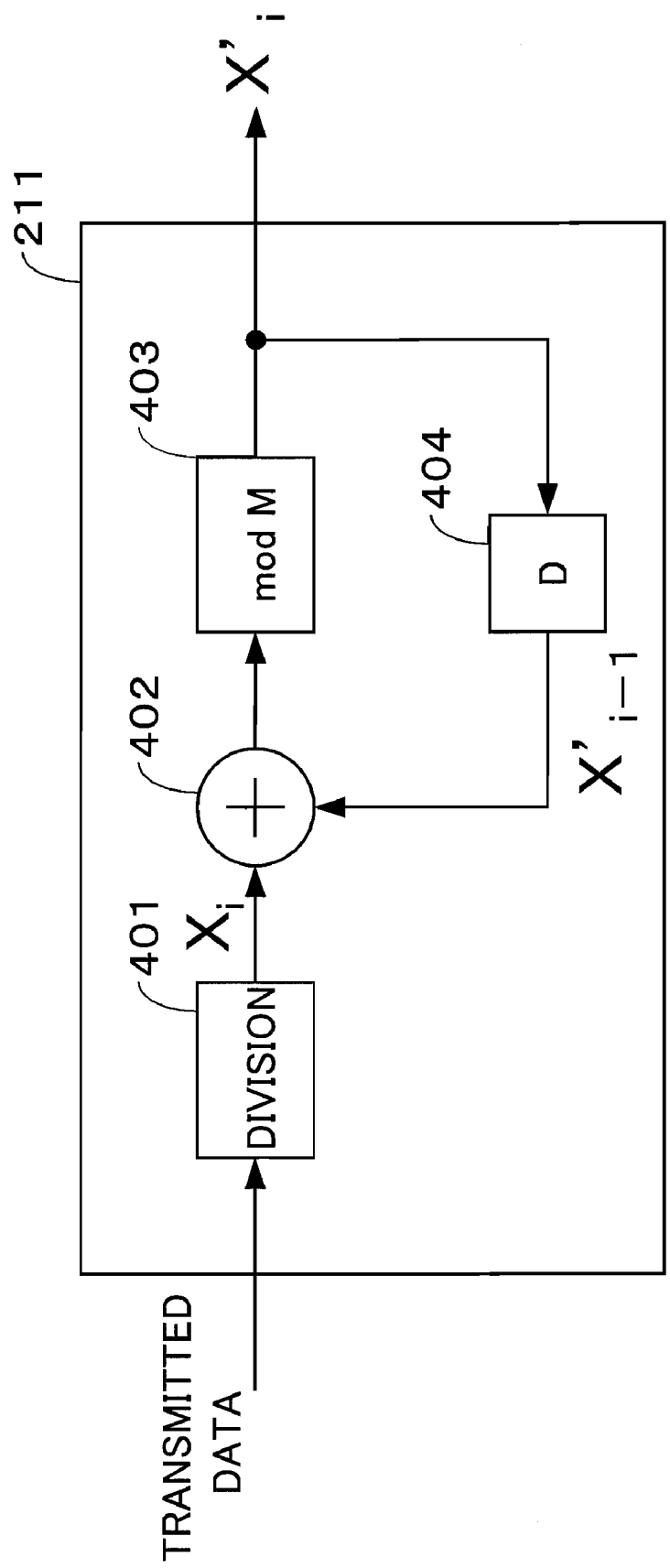
FIG. 4 is a block diagram illustrating a configuration example of a precoding section in the embodiment 1 of the present invention.

FIG. 4 is a block diagram illustrating a configuration example of the precoding section 211 in the transmission apparatus 201 according to the embodiment 1 of the present invention. The precoding section 211 can be constructed as described in the non-patent document 2 in which the canceling filter section 223 is regarded as a partial response filter. The precoding section 211 facilitates determining the demodulation data from the demodulation vectors, outputted by the canceling filter section 223, which have been subjected to the filtering, in the vector demodulation section 224. The precoding section 211 previously codes the transmitted data, corresponding to the processing in the canceling filter section 223. Hereinafter, a configuration and operations of the precoding section 211 will be described in detail.

The precoding section 211 first divides the received transmitted data of K bits into N groups and generates tentative modulation information $X_1, X_2, \ldots X_N$. The precoding section 211 codes the tentative modulation information $X_1, X_2, \ldots X_N$ using the following equation (2). Thus, the precoding section 211 generates and outputs N pieces of modulation information $X'_1, X'_2, \ldots X'_N$.

$$X'_i = P_0 X_i - \sum_{l=1}^{L-1} P_l X'_{i-l} \pmod{M} \qquad \text{Equation (2)}$$

For example, in a case where a filter length of the canceling filter section 223 is 2 and an equation of filtering is P(D)=(1−D), the precoding section 211 corresponding to the processing of the canceling filter section 223 can be constructed as shown in FIG. 4. As shown in FIG. 4, the precoding section 211 includes, a divider 401, an adder 402, a remainder device 403, and a delay device 404. The divider 401 receives the transmitted data of K bits inputted by the precoding section 211. The divider 401 divides the received transmitted data into N groups and generates and sequentially outputs the tentative modulation information $X_1, X_2, \ldots X_N$. The tentative modulation information can be represented as $X_i$ ($1 \leq i \leq N$ and i is an integer). The delay device 404 receives the precoded modulation information $X'_i$ sequentially outputted by the precoding section 211, delays the received information by one sample, and outputs the information. The modulation information of a sample which is immediately precoding can be represented as $X'_{i-1}$. The adder 402 obtains a sum of the tentative modulation information $X_i$ outputted by the divider 401 and the precoded modulation information $X'_{i-1}$ of the sample immediately precoding, which is outputted by the delay device 404. The remainder device 403 obtains a remainder resulting when the addition result outputted by the adder 402 is divided by a number of mapping points being M (M is an integer greater than or equal to 2). The remainder device 403 outputs the obtained remainder as precoded modulation information $X'_i$.

In a case where amplitude modulation such as M-ary PAM (Pulse Amplitude Modulation) is used in a modulation rule for the vector modulation section 212, the tentative modulation information $X_i$ and the precoded modulation information $X'_i$ are represented as M real numbers. The remainder device 403 obtains remainders resulting when the M real numbers are divided by M, respectively. In a case where M is 2, a modulation rule is binary PAM, which is equivalent to BPSK (Binary Phase Shift Keying).

In a case where quadrature amplitude modulation such as M-ary QAM (Quadrature Amplitude Modulation) is used in a modulation rule for the vector modulation section 212, the tentative modulation information $X_i$ and the modulation information $X'_i$ are represented as $m^2$ complex values having m real parts and m imaginary parts. Note $M=m^2$. The remainder device 403 obtains remainders resulting when the real parts and the imaginary parts are respectively divided by m. In a case where m is 2 (i.e. M is 4), a modulation rule is 4-ary QAM, which is equivalent to QPSK (Quadrature Phase Shift Keying).

Here, when the precoding section 211 sequentially obtains the N modulation information $X'_1, X'_2, \ldots X'_N$ using the above-mentioned equation (2), the modulation information $X'_1$ is first obtained. In order to obtain the modulation information $X'_1$, (L−1) pieces of modulation information $X'_{2-L}, \ldots, X'_0$ are previously needed as values outputted by the delay device 404. Therefore, known values are supposed to be given to the modulation information $X'_{2-L}, \ldots, X'_0$. It is only required that the precoding section 211 receives and holds the modulation information $X'_{2-L}, \ldots, X'_0$ prior to the modulation information $X'_1, X'_2, \ldots X'_N$, and outputs the modulation information $X'_{2-L}, \ldots, X'_0$. For example, in the precoding section 211, shown in FIG. 4, in which L=2 is supposed, when the N pieces of the $X'_1, X'_2, \ldots X'_N$ are obtained, one piece of modulation information $X'_0$ is previously needed as a value outputted by the delay device 404. In other words, it is required that the delay device 404 outputs the modulation information $X'_0$ simultaneously when the divider 401 outputs the tentative modulation information $X_1$. In this case, it is only required that the modulation information $X'_0$ is previously held as the known value in the delay device 404, and thereafter, the delay device 404 outputs the modulation information $X'_0$ synchronously when the divider 401 outputs the tentative modulation information $X_1$.

And when the canceling filter section 223 obtains N demodulation vectors $Y'_1, Y'_2, \ldots, Y'_N$, which have been subjected to the filtering, using the equation (1), the demodulation vector $Y'_1$ is first obtained. In order to obtain the modulation vector $Y'_1$, (L−1) modulation vectors $Y_{2-L}, \ldots, Y_0$ are previously needed as values outputted by the delay device 301. Therefore, it is only required that the modulation vectors $Y_{2-L}, \ldots, Y_0$ corresponding to the above-mentioned known (L−1) pieces of modulation information $X'_{2-L}, \ldots, X'_0$ outputted by the precoding section 211 are previously inputted to the canceling filter section 223. The reception apparatus 202 previously receives the demodulation vectors $Y_{2-L}, \ldots, Y_0$ from the transmission apparatus 201 and the canceling filter section 223 receives the received demodulation vectors. For example, in the canceling filter section 223, shown in FIG. 2, in which L=2 is assumed, when the N demodulation vectors $Y'_1, Y'_2, \ldots, Y'_N$ which have been subjected to the filtering are sequentially obtained, the demodulation vector $Y_0$ is previously needed as a value outputted by the delay device 301. In other words, it is required that the delay device 301 outputs the demodulation vector $Y_0$ simultaneously when the canceling filter section 223 receives the demodulation vector $Y_1$. In this case, it is only required that the demodulation vector $Y_0$ is previously inputted to the delay device 301 by the time when the demodulation vector $Y_1$ is inputted to the canceling filter section 223.

Figure 13:
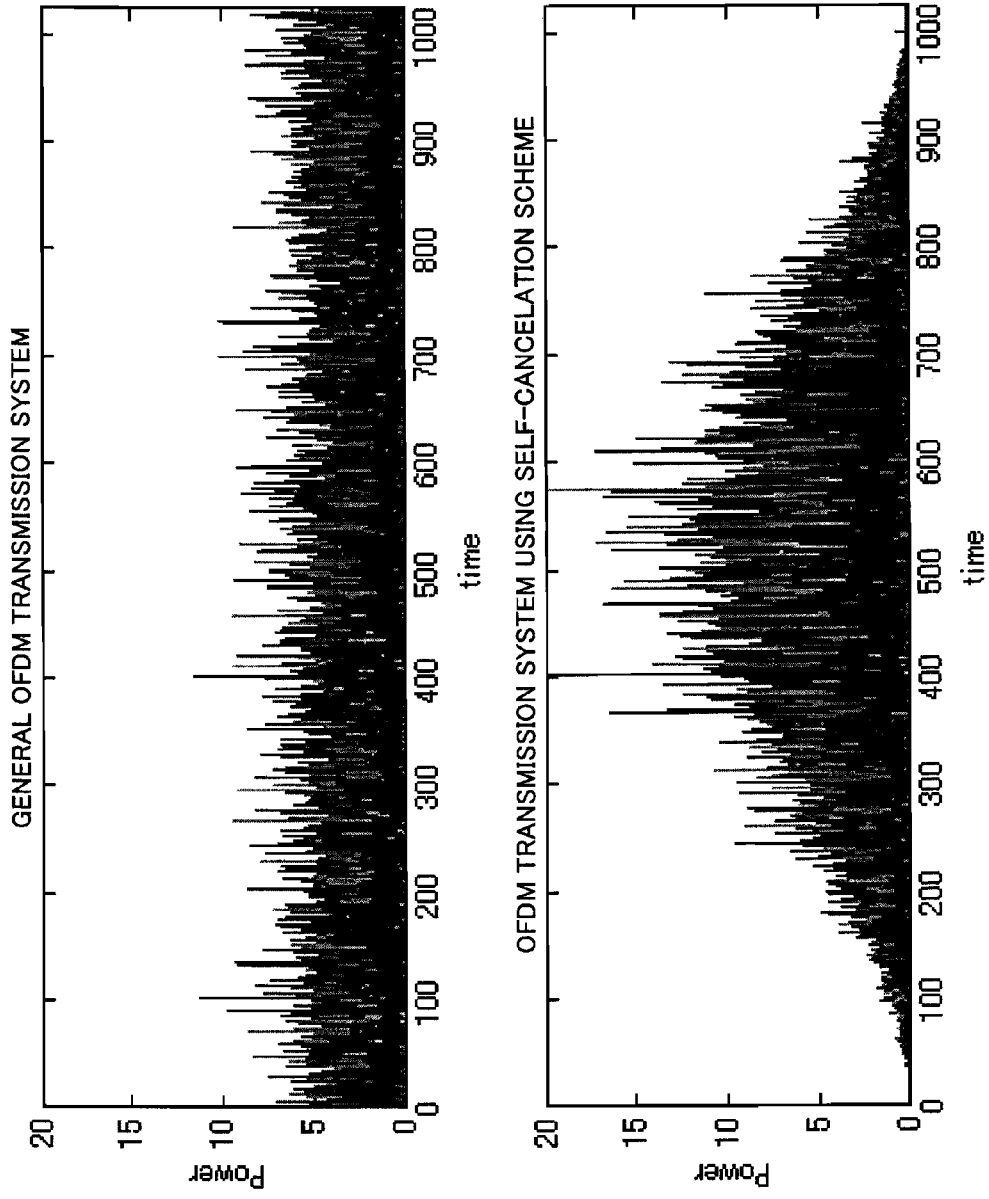
FIG. 13 is a diagram showing a power-time response in the conventional OFDM transmission system using the self-cancellation scheme.
Figure 14:
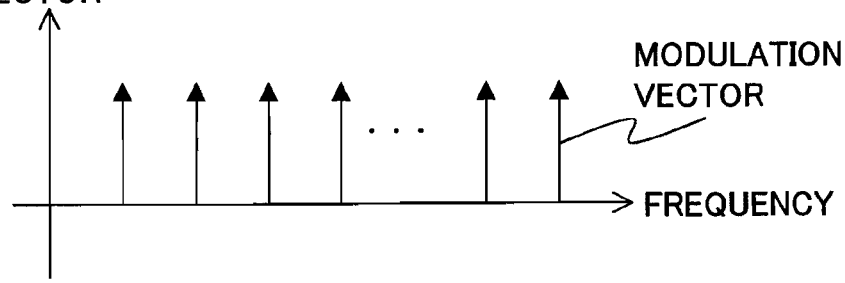
FIG. 14 is a diagram showing (a) an allocation state of the modulation vectors which are arranged on a frequency axis of subcarriers and showing (b) allocation of signal points (on a complex plane) of the modulation vectors and the demodulation vectors which have been subjected to canceling-demodulation in a case where in the conventional OFDM transmission system using the self-cancellation scheme, polarities of the modulation vectors are not inversed.
Figure 14:
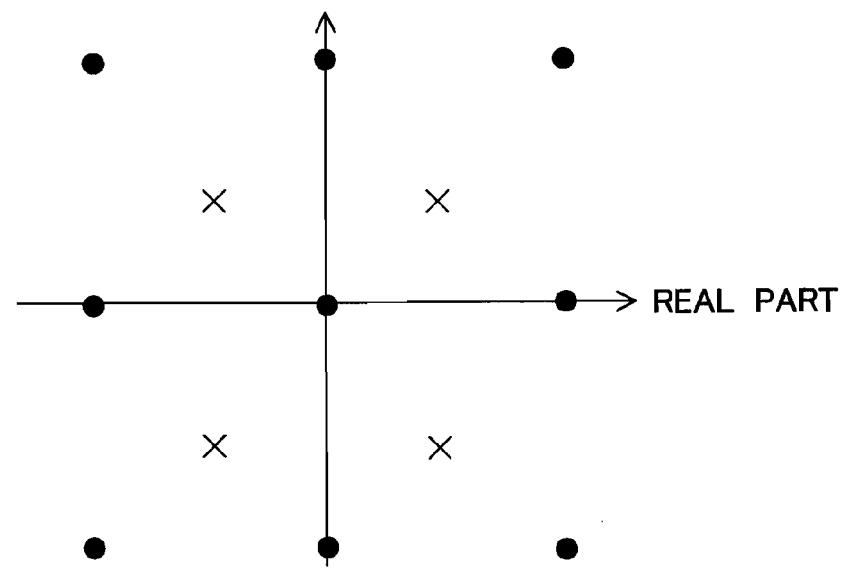

In the above-described configuration, the precoding section 211 in the transmission apparatus 201 divides the transmitted data into the N groups, subjects the divided data to the precoding processing, and generates the N pieces of modulation information. The vector modulation section 212 generates the N modulation vectors from the N pieces of modulation information. The multicarrier modulation section 213 respectively multicarrier-modulates the N subcarriers by using the N modulation vectors. Therefore, because all of the N subcarriers are respectively modulated by the transmitted data in an independent manner, the transmission efficiency is not reduced. The canceling filter section 223 in the reception apparatus 202, based on inter-carrier interference characteristics between the neighboring subcarriers, performs the filtering processing and cancels the inter-carrier interference. Thus, the inter-carrier interference caused by the frequency fluctuations, the amplitude fluctuations, the phase fluctuations, or the like can be reduced. In addition, in the transmission apparatus 201, unlike in the conventional art, the processing in which the subcarriers are divided into groups, each of which includes two subcarriers, and polarities of the modulation vectors allocated to each of the groups are inversed between the neighboring subcarriers is not performed. Therefore, a time response waveform of the multicarrier modulation signal outputted from the multicarrier modulation section 213 is comparatively flat as shown in the upper row in FIG. 13. Unlike in the conventional art, inconvenience that the signals having high power outputs are concentrated around the time of a central portion of a symbol and signal amplitudes around the central portion of the symbol are large does not arise. Accordingly, it is not needed to increase the maximum output power of the high frequency power amplifier in the transmission apparatus 201. Moreover, as shown in the below-described example, even if the number of signal points is increased through performing the canceling processing, the precoding processing is performed on the transmitting end, whereby the original transmitted data can be uniquely restored on the receiving end.

In the present embodiment, as one example of the multicarrier transmission system, the OFDM (Orthogonal Frequency Division Multiplexing) can be cited. In a case where the OFDM transmission system is used, the multicarrier modulation section 213 and the multicarrier demodulation section 222 can be constructed as shown in FIGS. 5 and 6, respectively.

Figure 5:
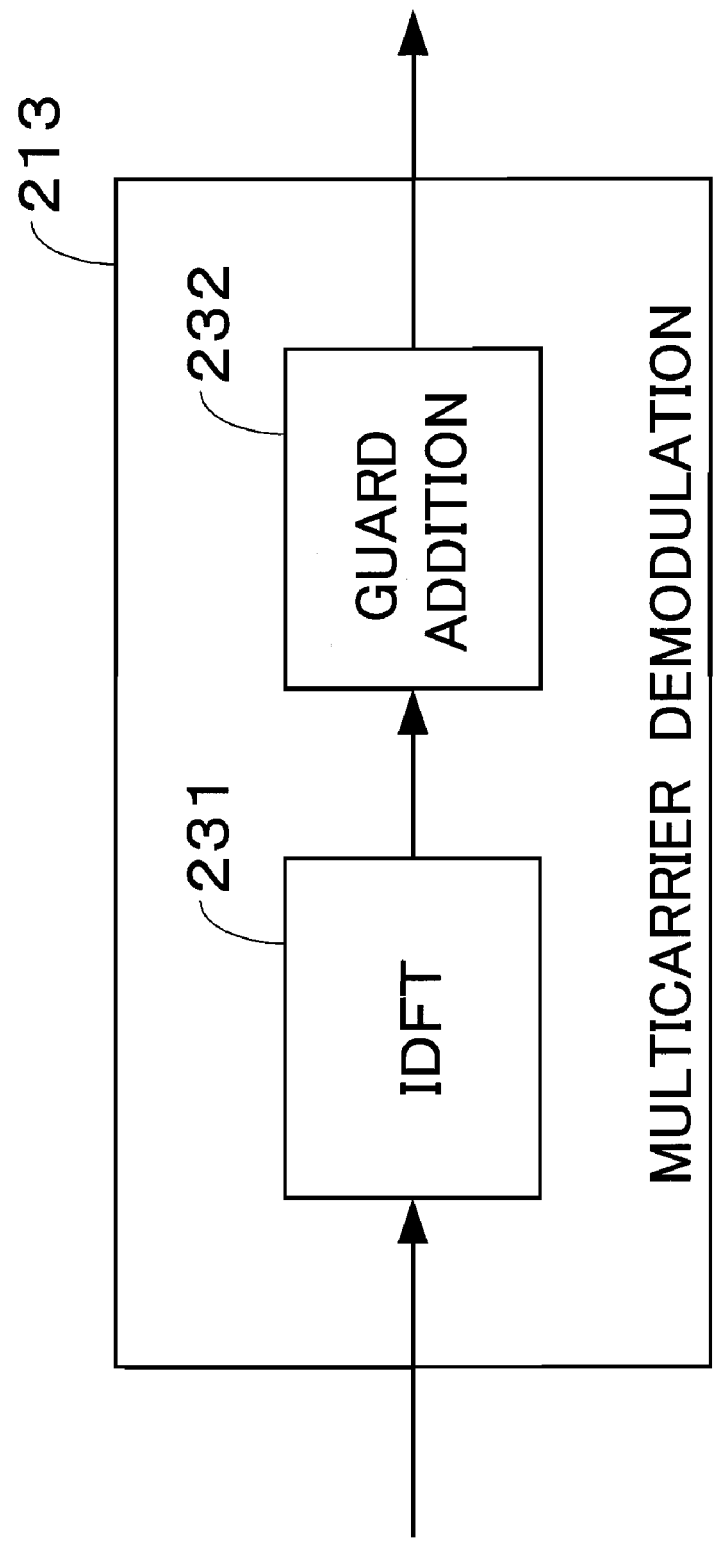
FIG. 5 is a block diagram illustrating a configuration example of a multicarrier modulation section in the embodiment 1 of the present invention.

As shown in FIG. 5, the multicarrier modulation section 213 include an IDFT section 231 and a guard interval addition section 232. The IDFT section 231 receives the N modulation vectors which have been inputted to the multicarrier modulation section 213, subjects the received modulation vectors to inverse Fourier transform, and generate to output an OFDM signal in a baseband. The guard interval addition section 232 receives the OFDM signal in the baseband, which is outputted by the IDFT section 231, and adds a signal with a guard interval, whose period is expanded, to the received OFDM signal in the baseband. The guard interval addition section 232 outputs, from the multicarrier modulation section 213, a multicarrier modulation signal in the baseband, to which the signal with the guard interval has been added.

Figure 6:
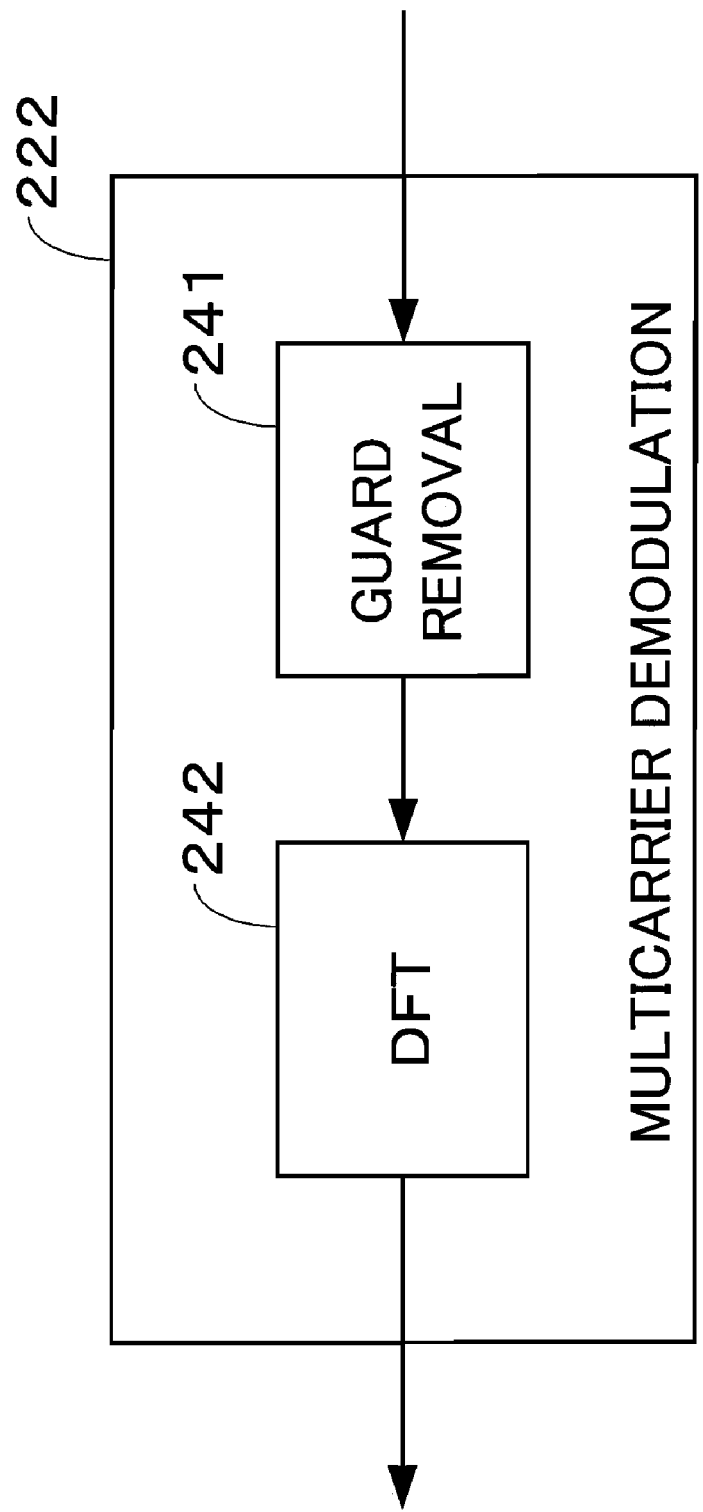
FIG. 6 is a block diagram illustrating a configuration example of a multicarrier demodulation section in the embodiment 1 of the present invention.

As shown in FIG. 6, the multicarrier demodulation section 222 includes a guard interval removal section 241 and a DFT section 242. The guard interval removal section 241 removes the signal with a guard interval from the multicarrier modulation signal in the baseband, which the multicarrier demodulation section 222 has received and outputs the resultant signal. The DFT section 242 subjects the signal outputted by the guard interval removal section 241 to Fourier transform and obtains N demodulation vectors. Subsequently, the DFT section 242 outputs the N demodulation vectors from the multicarrier demodulation section 222.

Example

Hereinafter, an example of the embodiment 1 will be introduced. Effects of the precoding section 211 and the canceling filter section 223 will be described referring to FIGS. 2, 3, 4, and 7. FIG. 7 is a diagram showing calculation processing performed in the precoding section 211 and arithmetic processing performed in the canceling filter section 223. In this example, a case where a number of mapping points being M in the multicarrier modulation system is 4 is assumed. Although a specific modulation system is not particularly limited, for example, QAM can be used. A filter length of the canceling filter section 223 is 2 and a polynomial of a filter is $P(D)=(1-D)$. FIG. 7 shows all combinations of calculations for obtaining the i-th modulation information $X'_i$ and the i-th modulation vector $Y'_i$. In FIG. 7, $X_i, X'_{i-1}, X'_i, Y_i, Y_{i-1}, Y'_i$ are shown in respective columns in order starting from the leftmost column.

Figure 11:
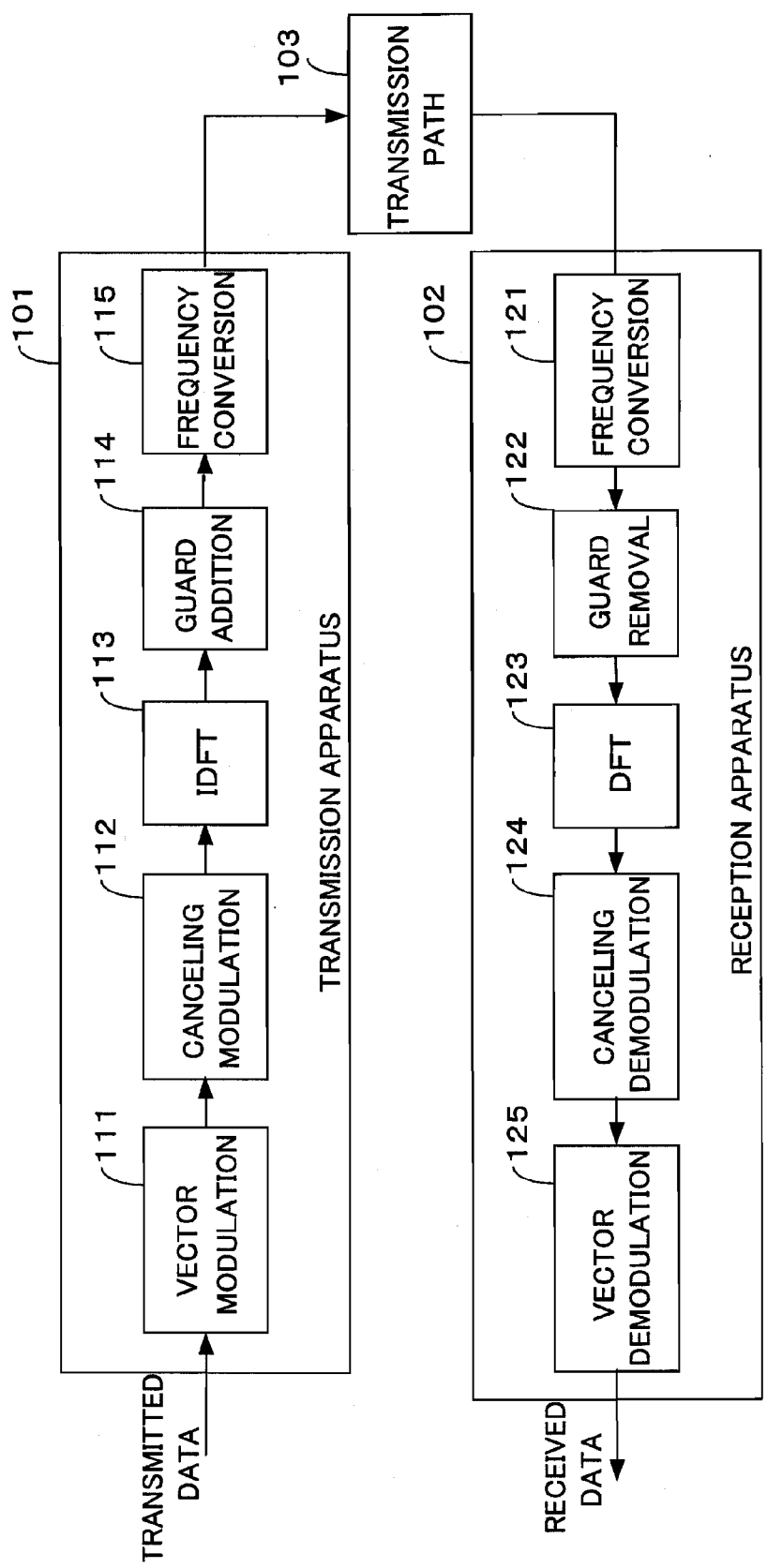
FIG. 11 is a block diagram illustrating a configuration of a transmission apparatus and a reception apparatus in a conventional OFDM transmission system using a self-cancellation scheme.
Figure 12:
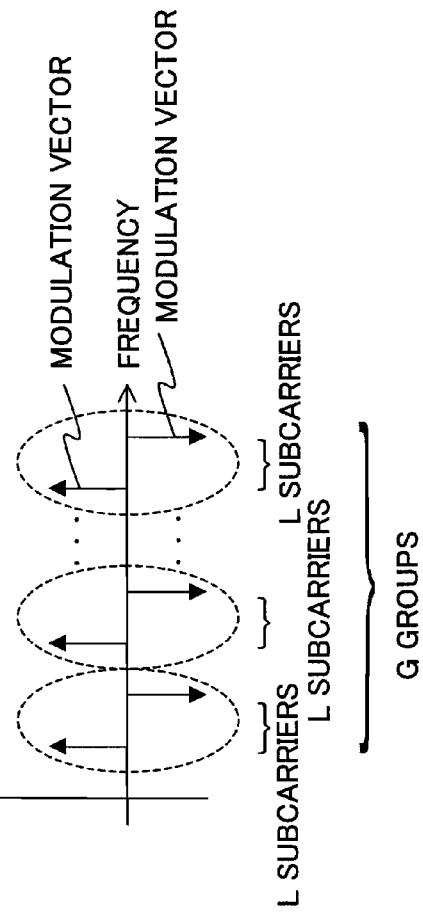
FIG. 12 is a diagram showing (a) an allocation state of modulation vectors which are arranged on a frequency axis and showing (b) allocation of signal points (on a complex plane) of the modulation vectors and the demodulation vectors which have been canceling-demodulated in the conventional OFDM transmission system using the self-cancellation scheme.
Figure 12:
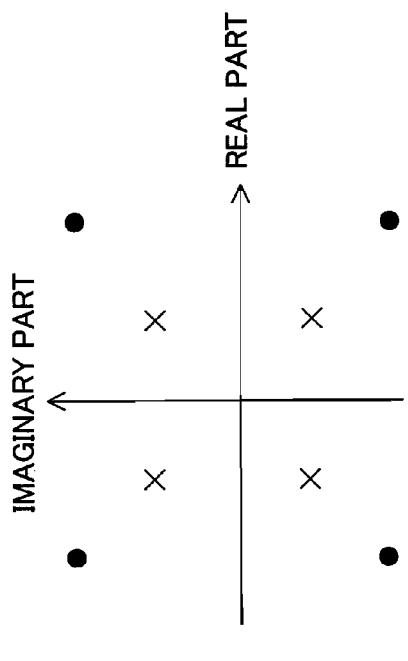

In FIG. 4, the transmitted data inputted to the precoding section 211 is first inputted to the divider 401. The divider 401 divides the inputted transmitted data into pieces of 2 bits and allocates each of the 2 bits to one symbol. Through dividing the transmitted data into the pieces of 2 bits, the transmitted data is coded as 4 values. Thus, the transmitted data is converted to tentative modulation information $X_i$ having the 4 values [0, 1, 2, 3] (i.e. a number of mapping points being 4) and outputted from the divider 401. The adder 402 adds up the i-th tentative modulation information $X_i$ and the (i−1) modulation information $X'_{i-1}$ held in the delay device 404. The (i−1) modulation information $X'_{i-1}$ also has 4 values [0, 1, 2, 3]. A value resulting from the addition is inputted to the remainder device 403. The remainder device 403 divides the inputted value resulting from the addition by the number of mapping points being 4 and obtains a remainder. The remainder obtained by the remainder device 403 is outputted from the precoding section 211 as the i-th modulation information $X'_i$. Here, since the i-th modulation information $X'_i$ is the remainder which is obtained through the division by the number of mapping points being 4 in the remainder device 403, as shown in FIG. 11, the i-th modulation information $X'_i$ has 4 values [0, 1, 2, 3]. In other words, the i-th modulation information $X'_i$ can be obtained from the i-th tentative modulation information $X_i$ and the (i−1)-th modulation information $X'_{i-1}$. The obtained i-th modulation information $X'_i$ is converted to modulation vectors on a complex plane in the vector modulation section 212. The obtained modulation vectors are used for multicarrier modulation of the subcarriers in the multicarrier modulation section 213. The obtained multicarrier modulation signal is frequency-converted to a signal in a frequency band suited to wireless communication in the frequency conversion section 214 and outputted from the transmission apparatus 201.

The multicarrier modulation signal outputted from the transmission apparatus 201 is received by the reception apparatus 202. In the reception apparatus 202, the multicarrier modulation signal is converted to a multicarrier modulation signal in a baseband in the frequency converter 221. The multicarrier modulation signal in the baseband is demodulated in the multicarrier demodulator 222. The demodulated signal is subjected to the filtering processing in the canceling filter section 223. In FIG. 2, when the i-th demodulation vector $Y_i$ is inputted to the canceling filter section 223, the (i−1)-th demodulation vector $Y_{i-1}$ has already been held in the delay device 301. The i-th demodulation vector $Y_i$ is multiplied by a filter coefficient "1" in the coefficient providing device 302 and the (i−1)-th demodulation vector $Y_{i-1}$ is multiplied by a filter coefficient "−1" in the coefficient providing device 303. The $Y_i$ and the $Y_{i-1}$ which have been multiplied by the respective filter coefficients are added up in the adder 304. A result obtained from the addition in the adder 304 is outputted, as the i-th demodulation vector $Y'_i$ which has been subjected to the filtering, from the canceling filter section 223. In other words, the i-th demodulation vector $Y'_i$ which has been subjected to the filtering is obtained by subtracting the (i−1)-th demodulation vector $Y_{i-1}$ from the i-th demodulation vector $Y_i$. This means that subtraction between two demodulation vectors respectively corresponding to neighboring subcarriers is conducted.

It is assumed that there is no transmission error, except the inter-carrier interference, in transmission between the transmission apparatus 201 and the reception apparatus 202. In other words, it is assumed that the i-th demodulation vector $Y_i$ is equal to the i-th modulation information $X'_i$ and the (i−1)-th demodulation vector $Y_{i-1}$ is equal to the (i−1)-th modulation information $X'_{i-1}$. In this case, the i-th demodulation vector $Y'_i$ which has been subjected to the filtering is a value shown in the rightmost column in FIG. 7. The demodulation vector $Y'_i$ which has been subjected to the filtering is outputted by the canceling filter section 223. In FIG. 7, it is understood that in a case where the i-th demodulation vector $Y'_i$ which has been subjected to the filtering is "0", as shown in the leftmost column, "0" is transmitted as the i-th tentative modulation information $X_i$. Similarly, it is understood that in a case where $Y'_i$ is "1" or "−3", "1" is transmitted as $X_i$. It is understood that in a case where $Y'_i$ is "2" or "−2", "2" is transmitted as $X_i$. It is understood that in a case where $Y'_i$ is "3" or "−1", "3" is transmitted as $X_i$. In other words, by observing the i-th demodulation vector $Y'_i$ which has been subjected to the filtering, the transmitted i-th tentative modulation information $X_i$ can be uniquely extrapolated. When the i-th tentative modulation information $X_i$ is uniquely obtained, transmitted data corresponding to the tentative modulation information $X_i$ can be obtained. Accordingly, in the embodiment 1, as shown in FIG. 3(b), even if the number of signal points is increased immediately after the canceling demodulation, the transmitted data can be easily and uniquely restored in the vector demodulation section 224.

In the processing by the canceling filter section 223, the i-th demodulation vector which has been subjected to the filtering is obtained based on the (i−1)-th demodulation vector $Y_{i-1}$. In the present embodiment, owing to the effect of the precoding section 211, even if the (i−1)-th demodulation vector $Y_{1-1}$, i.e. the (i−1)-th modulation information $X'_{i-1}$ is any value, the i-th tentative modulation information $X_i$ transmitted can be uniquely extrapolated from the i-th demodulation vector $Y'_i$ which has been subjected to the filtering. As described above, it is understood that by performing the precoding processing in the transmission apparatus, the transmitted data can be accurately restored on the receiving end, unlike in the above-described conventional art, without dividing the subcarriers into the groups each having the L subcarriers and without uniquely determining the relationship of the modulation vectors between the neighboring subcarriers included in each of the groups. Therefore, in the embodiment 1, unlike in the above-described conventional art, the transmission efficiency of a signal is not reduced to 1/L and a reduction in the transmission efficiency does not accrue.

Embodiment 2

Figure 8:
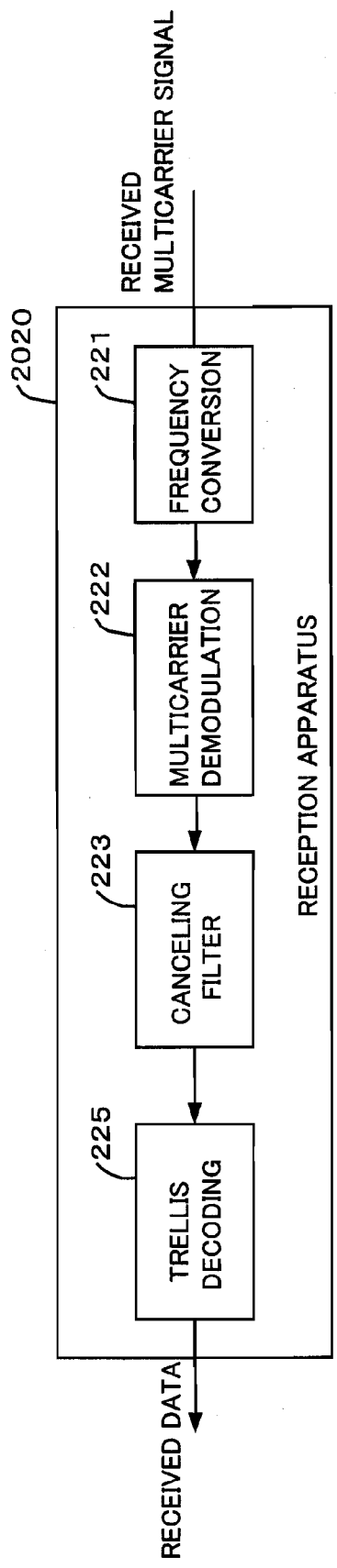
FIG. 8 is a block diagram illustrating a configuration of a reception apparatus in a multicarrier transmission system according to an embodiment 2 of the present invention.

FIG. 8 is a block diagram illustrating a configuration of a reception apparatus in a multicarrier transmission system according to an embodiment 2 of the present invention.

As shown in FIG. 8, the reception apparatus 2020 includes a frequency conversion section 221, a multicarrier demodulation section 222, a canceling filter section 223, and a trellis decoding section 225. In the reception apparatus 2020, the vector demodulation section 224 in the reception apparatus 202 (see FIG. 1) according to the embodiment 1 is replaced by the trellis decoding section 225 and the other components can be the same as those in the embodiment 1. In the below description, the same reference numerals as those in the embodiment 1 are used to denote the same components in the present embodiment as those in the embodiment 1, and the description thereof will be omitted.

The trellis decoding section 225 receives N demodulation vectors, outputted by the canceling filter section 223, which have been subjected to the filtering. The trellis decoding section 225 trellis-decodes the demodulation vectors which have been subjected to the filtering and generates to output K pieces of demodulation data. The K pieces of demodulation data outputted from the trellis decoding section 225 is outputted from the reception apparatus 2020.

The trellis decoding section 225, based on trellis transition in which (L−1) demodulation vectors held by a delay device 301 in the canceling filter section 223 are state variables, obtains the most probable transition from the received demodulation vectors. The trellis decoding section 225 obtains, as demodulation data, data which causes the most probable transition. The trellis decoding section 225 can be constructed using, for example, Viterbi algorithm (non-patent document 3), BCJR algorithm (non-patent document 4), MAP (maximum a posteriori probability) decoding or the like as decoding algorithm.

In this reception apparatus 2020, the canceling filter section 223 performs the filtering processing and the trellis decoding section 225 decodes the state transition of the canceling filter section 223. Therefore, the reception apparatus 2020 reduces inter-carrier interference caused by frequency fluctuations, amplitude fluctuations, or phase fluctuations without deteriorating a transmission efficiency of a signal, and is capable of accurately restoring the transmitted data. In addition, in the transmission apparatus 201, unlike in the conventional art, the processing in which polarities of modulation vectors modulating 2 neighboring subcarriers are inversed is not performed. Therefore, a time response waveform of a multicarrier modulation signal outputted from the multicarrier modulation section 213 is comparatively flat. Accordingly, it is not needed to increase maximum output power of a high-frequency power amplifier in the transmission apparatus 201.

In a case where the trellis decoding section 225 is used in the reception apparatus 2020, it is not required to perform the precoding processing in the transmission apparatus 201. In this case, it is only required to provide the divider 401 instead of the precoding section 211. There has already been a general transmission apparatus for the OFDM transmission, in which the divider 401 is provided instead of the precoding section 211. Therefore, instead of the transmission apparatus 201 according to the present embodiment, the general transmission apparatus can be utilized. Thus, even if the general transmission apparatus is used, the above-described excellent effect of the embodiment 1 can be exhibited. The embodiment 2 is particularly effective in a case where there are constraints in providing the precoding section 211 as in a broadcast transmission apparatus or the like.

Embodiment 3

Figure 9:
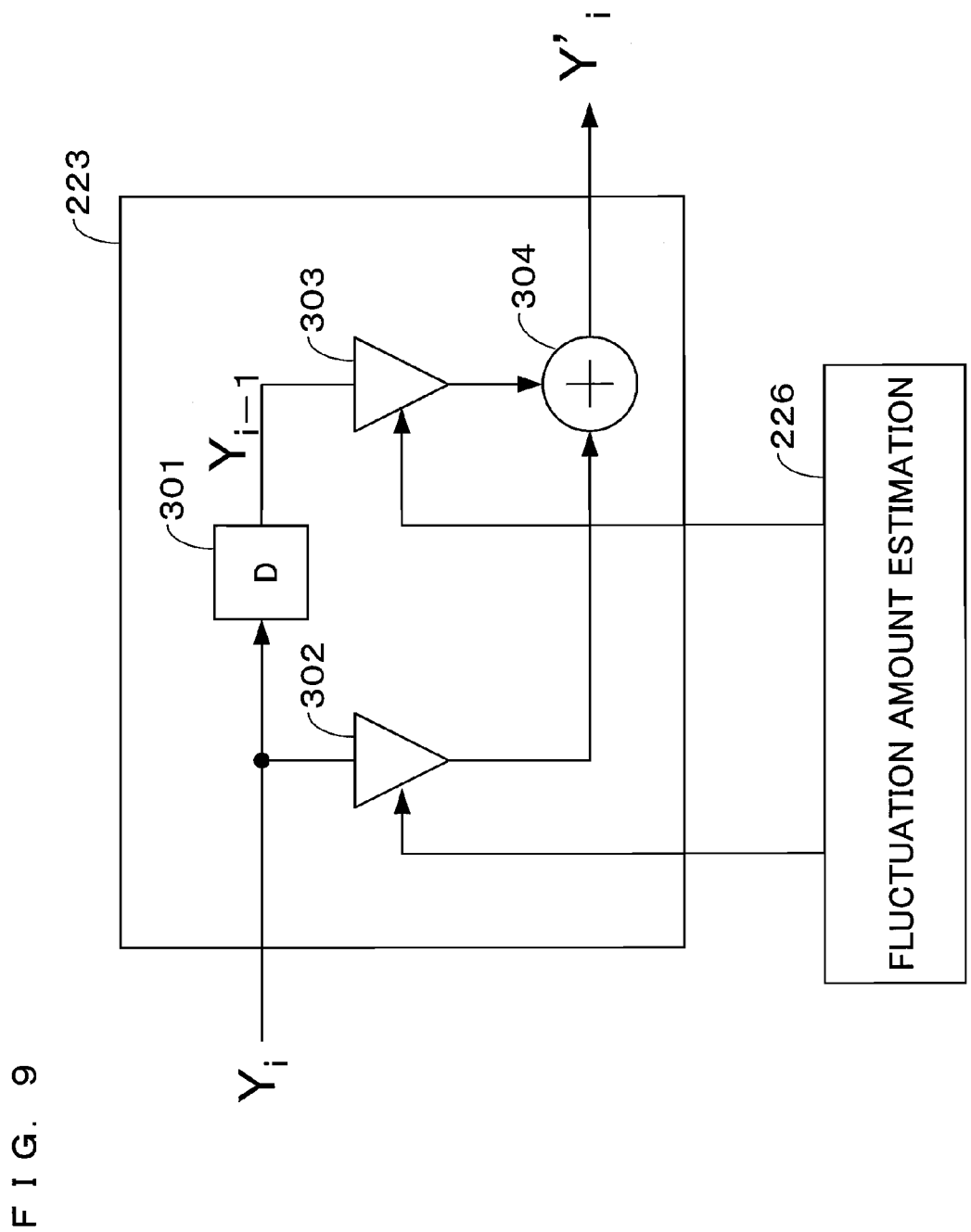
FIG. 9 is a block diagram illustrating a part of a reception apparatus in a multicarrier transmission system according to an embodiment 3 of the present invention.

FIG. 9 is a block diagram illustrating a part of a reception apparatus in a multicarrier transmission system according to an embodiment 3 of the present invention.

The reception apparatus (not shown) in the embodiment 3 is, as shown in FIG. 9, different from the reception apparatus in the embodiment 1 in that a fluctuation amount estimation section 226 is connected to coefficient providing sections 302 and 303 in a canceling filter section 223, and the other components in the embodiment 3 are the same as those in the embodiment 1. The same reference numerals as those in the embodiment 1 are used to denote the same components as those in the embodiment 1 and descriptions thereof will be omitted. The fluctuation amount estimation section 226 estimates fluctuation amounts of frequency fluctuations, amplitude fluctuations, phase fluctuations, or the like. The fluctuation amount estimation section 226 estimates, for example, a response of the transmission path from a known pilot signal which has been added to a multicarrier modulation signal and estimates the fluctuation amounts of the frequency fluctuations, the amplitude fluctuations, the phase fluctuations, or the like from time fluctuations in the response of the transmission path. Based on the fluctuation amounts estimated by the fluctuation amount estimation section 226, the canceling filter section 223 can control coefficients of the coefficient providing devices 302 and 303.

By controlling the coefficients of the coefficient providing devices 302 and 303 in accordance with the fluctuation amounts estimated by the fluctuation amount estimation section 226, a deviation in the response of the transmission path, which is caused by the fluctuations such as the frequency fluctuations, the phase fluctuations, or the amplitude fluctuations can be compensated, thereby further alleviating influence of the fluctuations.

Embodiment 4

Figure 10:
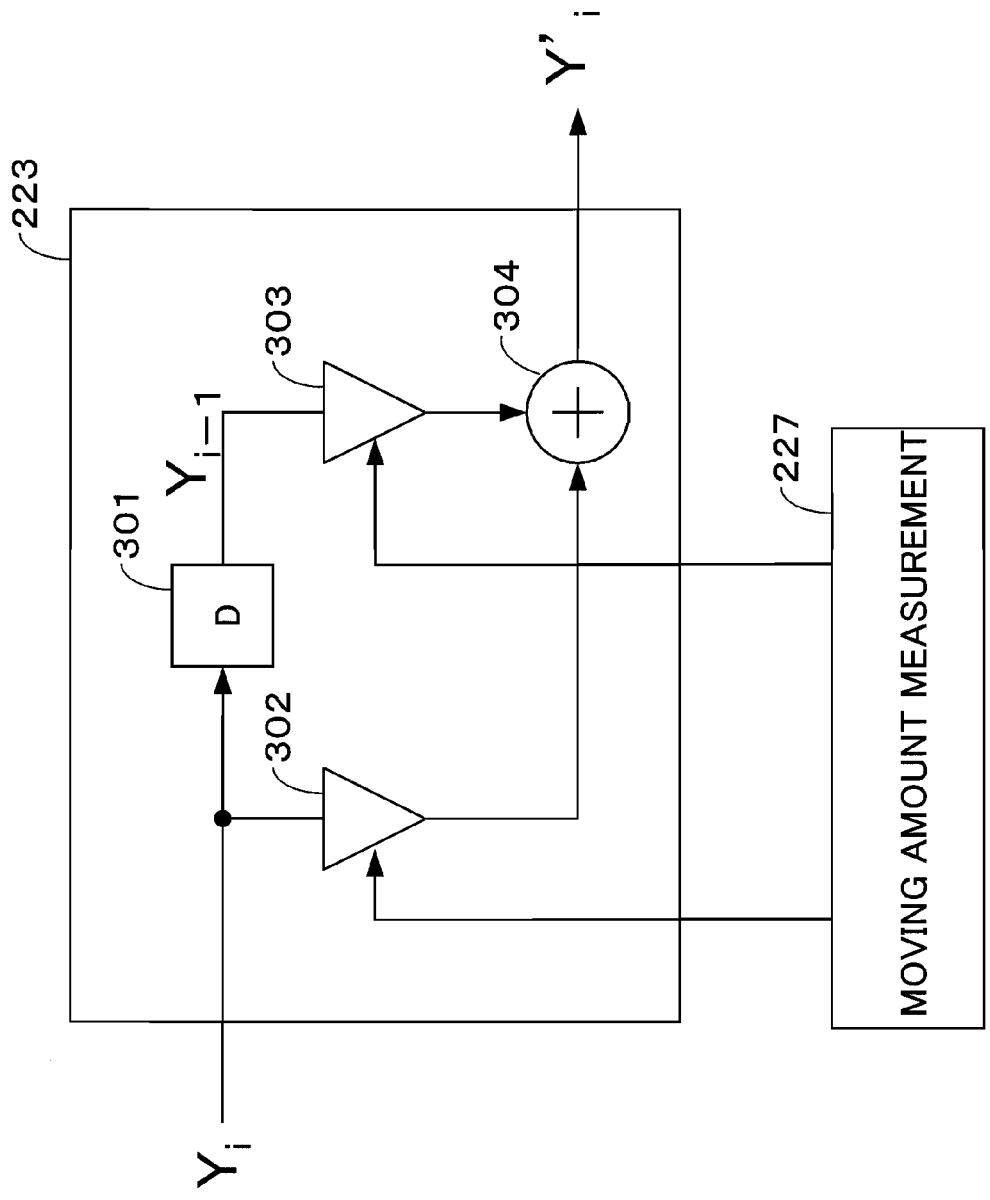
FIG. 10 is a block diagram illustrating a part of a reception apparatus in a multicarrier transmission system according to an embodiment 4 of the present invention.

FIG. 10 is a block diagram illustrating a part of a reception apparatus in a multicarrier transmission system according to an embodiment 4 of the present invention. The reception apparatus (not shown) in the embodiment 4 is, as shown in FIG. 10, different from the reception apparatus in the embodiment 1 in that a moving velocity measurement section 227 is connected to coefficient providing sections 302 and 303 in a canceling filter section 223, and the other components in the embodiment 4 are the same as those in the embodiment 1. The same reference numerals as those in the embodiment 1 are used to denote the same components as those in the embodiment 1 and descriptions thereof will be omitted. The moving velocity measurement section 227 is provided supposing, for example, a case where the reception apparatus 202 is installed in a mobile unit such as a vehicle or a case where the reception apparatus 202 is carried by a person. Although moving velocity measurement means of the moving velocity measurement section 227 is not particularly limited, for example, a moving velocity of the reception apparatus 202 can be detected by using a pulse generator of a mobile unit, such as a vehicle velocity pulse generator. Or the moving velocity measurement section 227, by using a position determination technology such as GPS, may measure a current position of a moving unit at predetermined time intervals and may calculate the moving velocity based on a distance of movement for a predetermined period of time.

In general, correlation between inter-carrier interference caused by a Doppler phenomenon and a moving velocity of a transmission apparatus or a reception apparatus is high. Therefore, by controlling the coefficients of the coefficient providing devices 302 and 303 in the canceling filter section 223 based on moving velocity information of the reception apparatus 202, which is obtained by the moving velocity measurement section 227, influence of the frequency fluctuations in particular can be further reduced.

Note that all of the above-described embodiments can be realized as an LSI, which is an integrated circuit. Each of the embodiments may be individually constructed in a chip form, or one chip may include all of the embodiments.

Note that the LSI may be referred to as an IC, a system LSI, a super LSI, or an ultra LSI, etc., depending on the degree of integration.

Also, the method of integration in the embodiments is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used.

Further, in the case where another integration technology replacing LSI becomes available due to improvement of a semiconductor technology or due to the emergence of another technology derived therefrom, integration of the functional blocks may be performed using such a new integration technology. For example, biotechnology may be applied to the above-mentioned integration.

INDUSTRIAL APPLICABILITY

The transmission apparatus and the reception apparatus in the multicarrier transmission system according to the present invention are capable of alleviating the inter-carrier interference occurring due to the frequency fluctuations or the like which are caused by the Doppler phenomenon and are useful in the mobile communication or the like.

The invention claimed is:

1. A reception apparatus in a multicarrier transmission system which subjects a plurality of subcarriers, which are orthogonal with each other, to multicarrier modulation and transmits digital data, the reception apparatus comprising:
a multicarrier demodulation section for receiving a multicarrier modulation signal, demodulating the received multicarrier modulation signal, and outputting demodulation vectors obtained by the demodulation;
a canceling filter section for receiving the demodulation vectors, subjecting the demodulation vectors, which respectively correspond to the subcarriers neighboring in a frequency axis direction, to filtering processing which cancels inter-carrier interference, and outputting filtered demodulation vectors obtained by the filtering processing; and
a vector demodulation section for determining received data from the filtered demodulation vectors and outputting the data, wherein the multicarrier demodulation section demodulates modulation vectors which modulate the subcarriers in a one-on-one relationship, and the filtered demodulation vectors uniquely correspond to precoded modulation information obtained by subjecting transmitted data to precoding processing in a transmission apparatus, and a correspondence relationship thereof is determinable in the vector demodulation section.

2. The reception apparatus in the multicarrier transmission system according to claim 1, wherein at a start of the filtering processing, the canceling filter section previously receives, from the transmission apparatus, and holds (L−1) demodulation vectors $Y_{2-L}, \ldots, Y_0$, which are needed when a first value $Y_1$ among values of the demodulation vectors is subjected to the filtering processing by using an equation for performing the filtering processing, as initial values prior to receiving the first value $Y_1$ among the values of the demodulation vectors vectors, the equation being:

$$Y'_i = \sum_{l=0}^{L-1} P_l Y_{i-l},$$

where

L is an integer that is greater than or equal to 2,

Y is a demodulation vector,

Y' is a demodulation vector that has been subjected to filtering, and

P is a polynomial.

3. The reception apparatus in the multicarrier transmission system according to claim 1, further comprising a fluctuation amount estimation section for estimating a fluctuation amount of any one of frequency fluctuations, amplitude fluctuations, and phase fluctuations in the received multicarrier modulation signal, wherein the fluctuation amount estimation section controls filter coefficients of the canceling filter section in accordance with the estimated fluctuation amount.

4. The reception apparatus in the multicarrier transmission system according to claim 1, wherein the canceling filter section is constructed of an FIR (Finite Impulse Response) filter in which an impulse response, when a delay element is D, is represented as $(1-D)^{(L-1)}$, where L is an integer that is greater than or equal to 2.

5. The reception apparatus in the multicarrier transmission system according to claim 1, further comprising a moving velocity measurement section for detecting a velocity at which the reception apparatus moves, wherein filter coefficients of the canceling filter section are controlled in accordance with moving velocity information obtained by the moving velocity measurement section.

6. The reception apparatus in the multicarrier transmission system according to claim 5, further comprising:

a velocity pulse generation section for a mobile unit, wherein the moving velocity measurement section, based on a velocity pulse outputted by the velocity pulse generation section, obtains the moving velocity information of the reception apparatus.

7. The reception apparatus in the multicarrier transmission system according to claim 5, wherein the moving velocity measurement section acquires positional information of the reception apparatus at predetermined time intervals and based on the positional information and the time intervals, obtains the moving velocity information of the reception apparatus.

8. A reception apparatus in a multicarrier transmission system which subjects a plurality of subcarriers, which are orthogonal with each other, to multicarrier modulation and transmits digital data, the reception apparatus comprising:

a multicarrier demodulation section for receiving a multicarrier modulation signal from a transmission apparatus, demodulating the multicarrier modulation signal, and outputting demodulation vectors obtained by the demodulation;

a canceling filter section for receiving the demodulation vectors, subjecting the demodulation vectors, which respectively correspond to the subcarriers neighboring in a frequency axis direction, to filtering processing which cancels inter-carrier interference, and outputting filtered demodulation vectors obtained by the filtering processing; and a trellis decoding section for receiving the filtered demodulation vectors, subjecting the filtered demodulation vectors to decoding processing based on trellis transition using a state variable of the filtering processing, and outputting received data obtained by the decoding processing, wherein the multicarrier demodulation section demodulates modulation vectors which modulate the subcarriers in a one-on-one relationship.

9. The reception apparatus in the multicarrier transmission system according to claim 8, wherein at a start of the filtering processing, the canceling filter section previously receives, from the transmission apparatus, and holds (L−1) demodulation vectors $Y_{2-L}, \ldots, Y_0$, which are needed when a first value $Y_1$ among values of the demodulation vectors is subjected to the filtering processing by using an equation for performing the filtering processing, as initial values prior to receiving the first value $Y_1$ among the values of the demodulation vectors, the equation being:

$$Y'_i = \sum_{l=0}^{L-1} P_l Y_{i-l},$$

where

L is an integer that is greater than or equal to 2,

Y is a demodulation vector,

Y' is a demodulation vector that has been subjected to filtering, and

P is a polynomial.

10. The reception apparatus in the multicarrier transmission system according to claim 8, further comprising a fluctuation amount estimation section for estimating a fluctuation amount of any one of frequency fluctuations, amplitude fluctuations, and phase fluctuations in the received multicarrier modulation signal, wherein the fluctuation amount estimation section controls filter coefficients of the canceling filter section in accordance with the estimated fluctuation amount.

11. The reception apparatus in the multicarrier transmission system according to claim 8, wherein the canceling filter section is constructed of an FIR (Finite Impulse Response) filter in which an impulse response, when a delay element is D, is represented as $(1-D)^{(L-1)}$, where L is an integer that is greater than or equal to 2.

12. The reception apparatus in the multicarrier transmission system according to claim 8, further comprising
a moving velocity measurement section for detecting a velocity at which the reception apparatus moves, wherein
filter coefficients of the canceling filter section are controlled based on moving velocity information obtained by the moving velocity measurement section.

13. The reception apparatus in the multicarrier transmission system according to claim 12, further comprising:
a velocity pulse generation section for a mobile unit, wherein
the moving velocity measurement section, based on a velocity pulse outputted by the velocity pulse generation section, obtains the moving velocity information of the reception apparatus.

14. The reception apparatus in the multicarrier transmission system according to claim 12, wherein the moving velocity measurement section acquires positional information of the reception apparatus at predetermined time intervals and based on the positional information and the time intervals, obtains the moving velocity information of the reception apparatus.

15. A reception method using a multicarrier transmission system which subjects a plurality of subcarriers, which are orthogonal with each other, to multicarrier modulation and transmits digital data, the reception method comprising:
a multicarrier demodulation step of receiving a multicarrier modulation signal, demodulating the received multicarrier modulation signal, and outputting demodulation vectors obtained by the demodulation;
a canceling filter step of receiving the demodulation vectors, subjecting the demodulation vectors, which respectively correspond to the subcarriers neighboring in a frequency axis direction, to filtering processing which cancels inter-carrier interference, and outputting filtered demodulation vectors obtained by the filtering processing; and
a vector demodulation step of determining received data from the filtered demodulation vectors and outputting the data, wherein
the multicarrier demodulation step demodulates the modulation vectors which modulate the subcarriers in a one-on-one relationship, and
the filtered demodulation vectors uniquely correspond to precoded modulation information obtained by subjecting transmitted data to precoding processing in a transmission apparatus, and a correspondence relationship thereof is determinable at the vector demodulation step.

16. A reception method using a multicarrier transmission system which subjects a plurality of subcarriers, which are orthogonal with each other, to multicarrier modulation and transmits digital data, the reception method comprising:
a multicarrier demodulation step of receiving a multicarrier modulation signal from a transmission apparatus, demodulating the multicarrier modulation signal, and outputting demodulation vectors obtained by the demodulation;
a canceling filter step of receiving the demodulation vectors, subjecting the demodulation vectors, which respectively correspond to the subcarriers neighboring in a frequency axis direction, to filtering processing which cancels inter-carrier interference, and outputting filtered demodulation vectors obtained by the filtering processing; and
a trellis decoding step of receiving the filtered demodulation vectors, subjecting the filtered demodulation vectors to decoding processing based on trellis transition using a state variable of the filtering processing, and outputting received data obtained by the decoding processing, wherein
the multicarrier demodulation step demodulates modulation vectors which modulate the subcarriers in a one-on-one relationship.

\* \* \* \* \*